United States Patent
Bae et al.

(10) Patent No.: US 9,515,675 B2
(45) Date of Patent: Dec. 6, 2016

(54) INTERFACE CIRCUIT OPERATING TO RECOVER ERROR OF TRANSMITTED DATA

(71) Applicant: SAMSUNG ELECTRONICS CO., LTD., Suwon-si (KR)

(72) Inventors: Joonsung Bae, Hwaseong-si (KR); Jaegeun Park, Seoul (KR); Kwang Hee Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 14/593,585

(22) Filed: Jan. 9, 2015

(65) Prior Publication Data

US 2015/0222389 A1  Aug. 6, 2015

(30) Foreign Application Priority Data

Feb. 4, 2014  (KR) ......................... 10-2014-0012733

(51) Int. Cl.
| | |
|---|---|
| *H04L 9/06* | (2006.01) |
| *H04L 25/14* | (2006.01) |
| *H04L 1/00* | (2006.01) |
| *H03M 5/14* | (2006.01) |

(52) U.S. Cl.
CPC .............. *H03M 5/145* (2013.01); *H04L 25/14* (2013.01); *H04L 1/0009* (2013.01); *H04L 1/0045* (2013.01); *H04L 1/0071* (2013.01); *H04L 9/0662* (2013.01)

(58) Field of Classification Search
CPC ....... H03M 5/145; H04L 9/0662; H04L 25/14; H04L 1/0009; H04L 1/0045; H04L 1/0071

USPC .......................................................... 714/776
See application file for complete search history.

(56) References Cited

U.S. PATENT DOCUMENTS

| | | | |
|---|---|---|---|
| 7,159,137 B2* | 1/2007 | Nemawarkar | G06F 1/10 |
| | | | 709/222 |
| 7,395,363 B2 | 7/2008 | Sterin | |
| 7,613,959 B2 | 11/2009 | Tseng | |
| 7,694,204 B2 | 4/2010 | Schmidt et al. | |
| 7,757,020 B2 | 7/2010 | Sharma et al. | |
| 7,840,882 B2* | 11/2010 | Lee | H04L 1/0047 |
| | | | 714/755 |
| 7,949,809 B2 | 5/2011 | Li et al. | |
| 8,166,334 B2 | 4/2012 | Lai et al. | |
| 8,879,680 B2* | 11/2014 | Tresidder | G06F 13/4273 |
| | | | 375/295 |
| 9,059,844 B2* | 6/2015 | Ahn | H04L 5/1423 |

(Continued)

FOREIGN PATENT DOCUMENTS

| | | |
|---|---|---|
| JP | 2011-71579 A | 4/2011 |
| JP | 2011-248814 A | 12/2011 |

*Primary Examiner* — James C Kerveros
(74) *Attorney, Agent, or Firm* — Sughrue Mion, PLLC

(57) ABSTRACT

Provided is an interface circuit for transmitting and receiving data according to a communication protocol. The interface circuit includes: an encoder configured to encode input data to generate transmission data; a transmitter configured to output the transmission data; a data sequence detector configured to detect whether the number of successively same logic values in a data string of the transmission data is equal to or greater than a reference succession number; and a recovery section configured to control a recovery operation with respect to the transmission data, based on a detection result of the data sequence detector. With the interface circuit, data loss is prevented and data reliability is guaranteed.

20 Claims, 16 Drawing Sheets

(56) References Cited

U.S. PATENT DOCUMENTS

| | | |
|---|---|---|
| 2004/0181744 A1* | 9/2004 | Sindhushayana . H03M 13/2957 714/794 |
| 2005/0204242 A1* | 9/2005 | Chou ................... H04L 1/0017 714/741 |
| 2006/0050707 A1 | 3/2006 | Sterin |
| 2006/0117125 A1 | 6/2006 | Tseng |
| 2007/0008898 A1 | 1/2007 | Sharma et al. |
| 2007/0198878 A1* | 8/2007 | Dei ....................... H04L 1/0009 714/712 |
| 2007/0260965 A1* | 11/2007 | Schmidt ................ H04L 1/0045 714/799 |
| 2008/0151781 A1 | 6/2008 | Li et al. |
| 2010/0077276 A1* | 3/2010 | Okamura ........... H03M 13/1102 714/752 |
| 2010/0246389 A1* | 9/2010 | Toyoda ............... H04L 41/0677 370/226 |
| 2010/0315135 A1 | 12/2010 | Lai et al. |
| 2012/0206214 A1* | 8/2012 | Wang .................. H04L 25/0278 333/32 |
| 2013/0159764 A1 | 6/2013 | Adar et al. |
| 2014/0056370 A1* | 2/2014 | Chang .................... H04L 25/14 375/259 |

\* cited by examiner

INTERFACE CIRCUIT OPERATING TO RECOVER ERROR OF TRANSMITTED DATA

CROSS-REFERENCE TO RELATED APPLICATION

This application claims priority from Korean Patent Application No. 10-2014-0012733, filed on Feb. 4, 2014 in the Korean Intellectual Property Office (KIPO), the entire contents of which are hereby incorporated by reference.

BACKGROUND

1. Technical Field

Apparatuses and methods consistent with exemplary embodiments relate to interface technologies, and more particularly, to an interface circuit configured to transmit and receive data according to a communication protocol.

2. Description of the Related Art

An interface circuit or device is used to transmit and receive data between electronic devices. Recently, as performance of an electronic device continuously improves, an interface circuit or device having wide bandwidth is needed. In particular, an interface technology based on a related art peripheral component interconnect express (hereinafter it is referred to as PCIe) protocol is widely used as a high speed serial interface technology.

An 8b/10b encoding is used in the related art first generation PCIe protocol and the related art second generation PCIe protocol. According to the 8b/10b encoding, data having a length of ten bits is generated by adding a bit string of two bits to data of eight bits. The generated data is serially transmitted according to the PCIe protocol. In this case, the bit string of two bits is added to cause the number of logic values of '0' and logic values of '1', which are included in data being serially transmitted, to be equal. However, the added bit string of two bits occupies 20 percent of the length (i.e., ten bits) of data being serially transmitted. Thus, when the 8b/10b encoding is used, bandwidth efficiency is degraded.

A 128b/130b encoding is used in the related art third generation PCIe protocol. According to the 128b/130b encoding, information data has a length of 128 bits. Additionally, sync header data of two bits, indicating whether the information data of 128 bits is general data or control data, is added to the information data of 128 bits. According to the 128b/130b encoding, the length (i.e., 128 bits) of the information data is much greater than the length (i.e., two bits) of the sync header data. Thus, when the 128b/130b encoding is used, bandwidth efficiency is improved.

According to the PCIe protocol, a clock and data recovery (hereinafter referred to as CDR) circuit is included in a data receiving unit. The CDR circuit extracts clock information of a data transmission unit from data being input. Then, the CDR circuit recovers original data by sampling data input, based on the extracted clock information. According to the 8b/10b encoding, a data string of data input to the CDR circuit includes the same number of logic values of '0' and logic values of '1'. Thus, according to the 8b/10b encoding, the logic values of the data string of the data input to the CDR circuit transits enough to extract the clock information.

However, according to the 128b/130b encoding, the logic values of the data string of the data input to the CDR circuit may not sufficiently transit. According to the 128b/130b encoding, in the worst case, the data string of the data input to the CDR circuit may include 129 successive logic values of '0' or logic values of '1'. In this case, the CDR circuit cannot extract the clock information of the data transmission unit and, as a result, original data cannot be recovered.

SUMMARY

According to an aspect of an exemplary embodiment, there is provided an interface circuit for transmitting and receiving data according to a communication protocol, the interface circuit including: an encoder for encoding input data to generate transmission data; a transmitter for outputting the transmission data; a data sequence detector for detecting whether the number of successively same logic values in a data string of the transmission data is equal to or greater than a reference succession number; and a recovery section for controlling a recovery operation with respect to the transmission data, based on a detection result of the data sequence detector.

According to an aspect of another exemplary embodiment, there is provided an interface circuit for transmitting and receiving data according to a PCIe protocol, the interface circuit including: a lane encoder for encoding input data with an encoding method of the PCIe protocol to generate transmission data; a transmitter for outputting the transmission data; a data sequence detector for detecting whether the number of successively same logic values in a data string of the transmission data is equal to or greater than a reference succession number; and a link training and status state machine (LTSSM) for controlling a recovery operation with respect to the transmission data, based on a detection result of the data sequence detector.

According to an aspect of another exemplary embodiment, there is provided a method of generating transmission data, the method including: encoding, by a transmitting device, input data to generate transmission data; detecting, by the transmitting device, whether a data string of the transmission data sufficiently transits to extract clock information; and determining, by the transmitting device, whether to perform a recovery operation with respect to the transmission data, based on a result of the detecting.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION OF EXEMPLARY EMBODIMENTS

Figure 1:
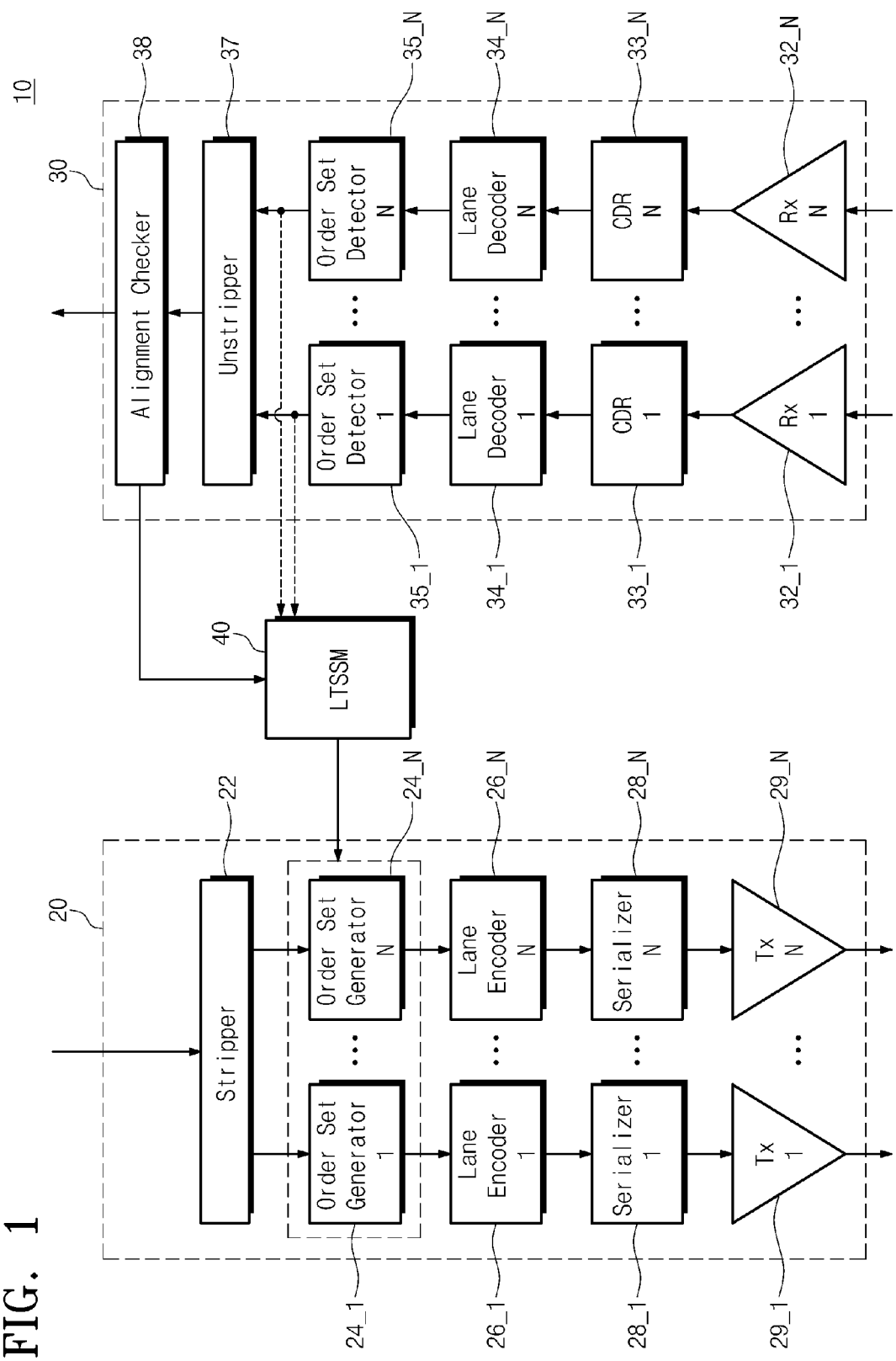
FIGS. 1 to 3 are a block diagram and schematic diagrams illustrating an operation of an interface circuit.

Exemplary embodiments will be described more fully hereinafter with reference to the accompanying drawings. An exemplary embodiment may, however, be embodied in many different forms and should not be construed as limited to exemplary embodiments set forth herein. Rather, these exemplary embodiments are provided such that this disclosure will be thorough and complete, and will fully convey the scope of the inventive concept to those skilled in the art. In the drawings, the size and relative sizes of layers and regions may be exaggerated for clarity. Like reference numerals refer to like elements throughout.

It will be understood that, although the terms first, second, etc., may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items. Furthermore, as used herein, expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
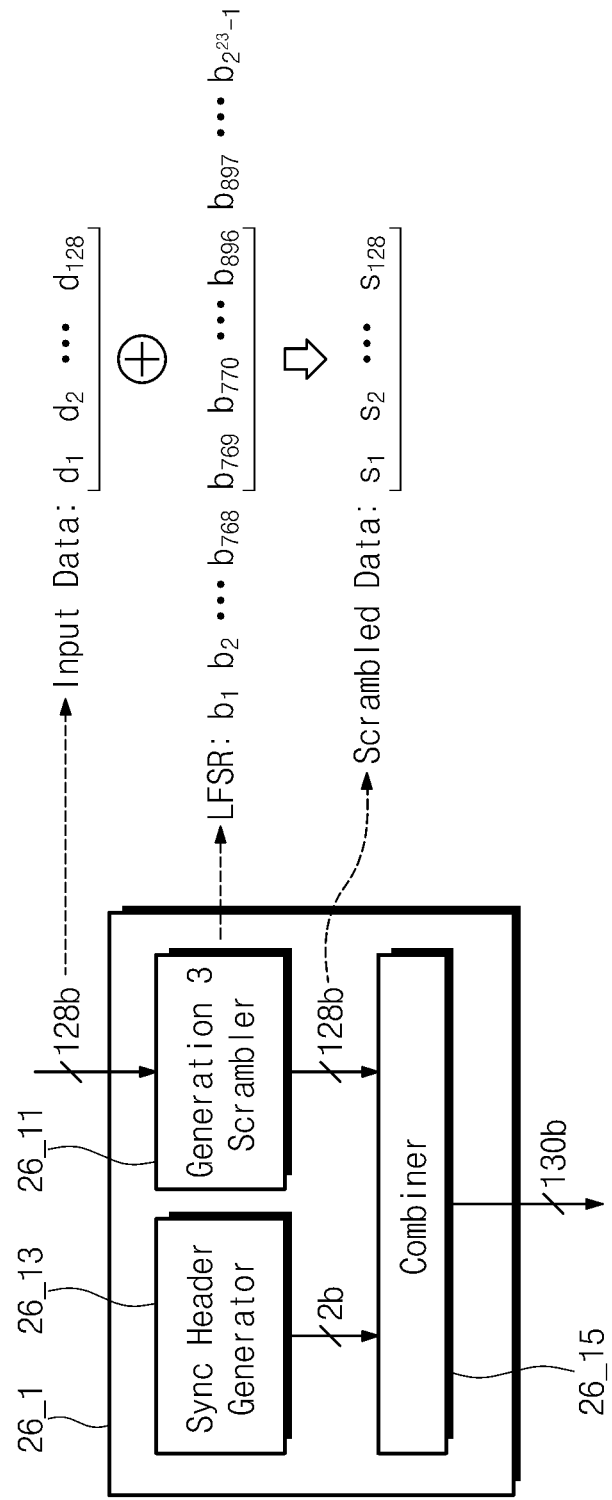
Figure 3:
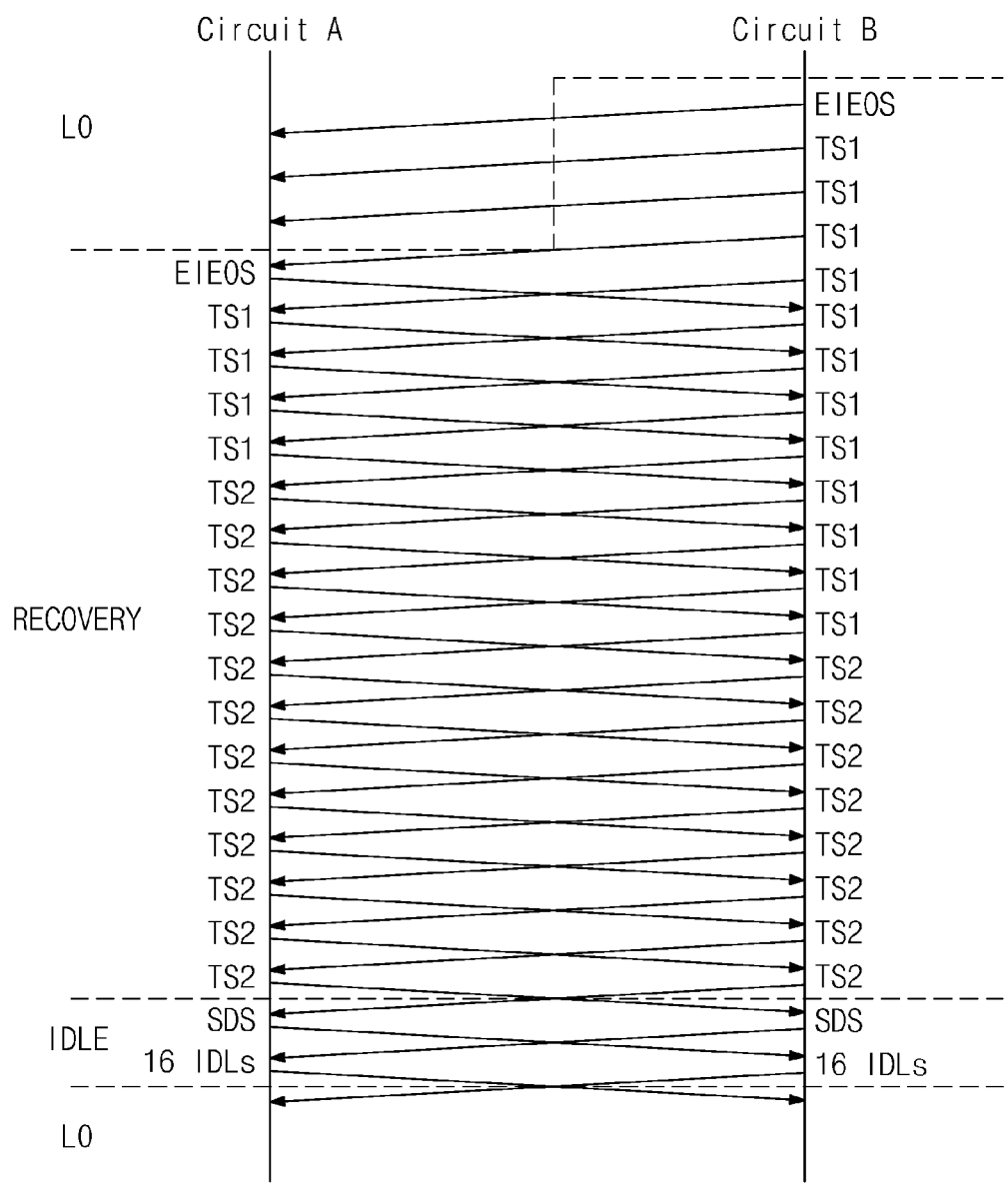

FIGS. 1 to 3 are a block diagram and schematic diagrams illustrating an operation of an interface circuit 10.

FIG. 1 illustrates a configuration of an interface circuit 10. In particular, the interface circuit 10 of FIG. 1 operates according to a peripheral component interconnect express (hereinafter referred to as PCIe) protocol. The interface circuit 10 may include a transmission section 20, a receiving section 30, and a link training and status state machine (LTSSM) 40. That is, the interface circuit 10 performs an operation of a physical layer defined by the PCIe protocol.

Data provided to the transmission section 20 is divided into data to be transmitted to each of N lanes by a stripper 22. N order set generators 24_1 to 24_N generate an order set transmitted through the N lanes, respectively. The order set is a signal formed by a bit string having a pattern that is configured according to a specification of the PCIe protocol to perform a specific operation. N lane encoders 26_1 to 26_N encode data transmitted through the N lanes, respectively. The configuration of each of the N lane encoders 26_1 to 26_N will now be described with reference to FIG. 2.

FIG. 2 illustrates a configuration of a first lane encoder 26_1. Referring to FIG. 2, information data having a length of 128 bits is provided to a third generation scrambler 26_11. The third generation scrambler 26_11 includes at least one linear feedback shift register (LFSR) for storing a bit string having a length of $(2^{23}-1)$ bits. The third generation scrambler 26_11 performs a logical operation, which is set according to a specification of the PCIe protocol, on the information data of 128 bits and a portion of the bit string of $(2^{23}-1)$ bits stored in the LFSR. Each bit forming the bit string stored in the LFSR is used in the logical operation sequentially from a bit of a first bit position. The third generation scrambler 26_11 outputs scrambled data having a length of 128 bits as a result of the logical operation.

A sync header generator 26_13 outputs sync header data having a length of two bits. The sync header data indicates whether the information data of 128 bits input to the third generation scrambler 26_11 is general data or control data. A combiner 26_15 combines the sync header data of two bits output from the sync header generator 26_13 and the scrambled data of 128 bits output from the third generation scrambler 26_11. Encoded data 130b having a length of 130 bits generated by the combiner 26_15 is output from the first lane encoder 26_1.

Each of other lane encoders 26_2 to 26_N has the same or similar configurations and operations as the first lane encoder 26_1. However, the LFSRs included in the third generation scramblers 26_11 of the N lane encoders 26_1 to 26_N store different bit strings from one another. Thus, even though the same information data is provided to each of the N lane encoders 26_1 to 26_N, the N lane encoders 26_1 to 26_N output different encoded data 130b from one another.

Referring back to FIG. 1, encoded data output from the N lane encoders 26_1 to 26_N are provided to N serializers 28_1 to 28_N, respectively. Each of the N serializers 28_1 to 28_N serializes a data string of provided data to output serialized data. N transmitters 29_1 to 29_N output the serialized data provided from the N serializers 28_1 to 28_N, respectively. Data output from the N transmitters 29_1 to 29_N are transmitted to receiving units of another interface circuit.

N receiving units 32_1 to 32_N of the receiving section 30 receive data transmitted from transmitters of another interface circuit. The N receiving units 32_1 to 32_N provide the received data to N clock and data recovery (CDR) circuits 33_1 to 33_N, respectively. Each of the N CDR circuits 33_1 to 33_N extracts clock information of the transmitters of the other interface circuit. Then, each of the N CDR circuits 33_1 to 33_N recovers original data by sampling the provided data, based on the extracted clock information. N lane decoders 34_1 to 34_N decode data recovered by the N CDR circuits 33_1 to 33_N, respectively.

Each of N order set detectors 35_1 to 35_N detects whether a bit string corresponding to the order set is included in a data string of the decoded data. An unstripper 37 combines data received through the N lanes to generate significant data. An alignment checker 38 checks whether an alignment error exists in the data generated by the unstripper 37. If an alignment error exists in the data generated by the unstripper 37, the LTSSM 40 controls the interface circuit 10 such that a recovery operation is performed. In particular, the LTSSM 40 may control the interface circuit 10 according to the order set received from the transmitters of the other interface circuit. Further, the LTSSM 40 may control the N order set generators 24_1 to 24_N such that the order set is transmitted to the receiving unit of another interface.

According to a 128b/130b encoding of the third generation PCIe protocol, logic values of a data string of data provided to at least one of the N CDR circuits 33_1 to 33_N may not transit enough to extract clock information. In the worst case, the data string of the data provided to at least one of the N CDR circuits 33_1 to 33_N may include 129 successive logic values of '0' or logic values of '1'. For instance, in an environment where data having large capacity exists, the third generation scrambler 26_11 may accidentally generate a data string which does not sufficiently transit. Also, as another example, a data string that does not sufficiently transit may be intentionally generated by a malicious attacker who knows a value of a bit string stored in the LFSR included in the third generation scrambler 26_11.

If a data string that does not sufficiently transit is provided to the N CDR circuits 33_1 to 33_N, the N CDR circuits 33_1 to 33_N may not extract clock information of the transmitters of another interface circuit. As a result, the N CDR circuits 33_1 to 33_N may not recover original data. If the N CDR circuits 33_1 to 33_N do not recover the original data, the alignment checker 38 determines that an alignment error exists in data generated by the unstripper 37. According to a determination result of the alignment checker 38, the LTSSM 40 controls the interface circuit 10 such that a recovery operation is performed. The recovery operation performed under the control of the LTSSM 40 will now be described with reference to FIG. 3.

FIG. 3 is a schematic diagram illustrating a recovery operation performed when an alignment error exists in data generated by the unstripper 37. A first interface circuit A exchanges data with a second interface circuit B in a normal state L0 according to the third generation PCIe protocol. Here, it is assumed that a data string that does not sufficiently transit is generated by at least one of the N lane encoders 26_1 to 26_N of the first interface circuit A. In this case, from among the N CDR circuits 33_1 to 33_N of the second interface circuit B, a CDR circuit that receives a data string that does not sufficiently transit may not recover original data. As a result, an alignment error occurs in data generated by the unstripper 37 of the second interface circuit B.

The LTSSM 40 of the second interface circuit B controls the second interface circuit B to enter a recovery state RECOVERY. The LTSSM 40 of the second interface circuit B transmits an 'EIEOS' order set to the first interface circuit A. A bit position of a portion used in a logical operation from among a bit string stored in the LFSR of the first interface circuit A is initialized by the EIEOS' order set. According to the initialization, each bit forming the bit string stored in the LFSR is used in the logical operation sequentially from a bit of a first bit position. Then, the first and second interface circuits A and B perform a recovery operation while exchanging 'TS1' and 'TS2' order sets with each other. The first and second interface circuits A and B enter an idle state to exchange 'SDS' and 'IDL' order sets with each other. Subsequently, the first and second interface circuits A and B enter the normal state L0 again to exchange data with each other.

If the first and second interface circuits A and B enter the normal state L0 again, data that is the basis of the previous alignment error is provided to the N lane encoders 26_1 to 26_N of the first interface circuit A. As described above, a bit position of a portion used in the logical operation from among the bit string stored in the LFSR of the first interface circuit A is initialized by the EIEOS' order set. Thus, the logical operation by the third generation scrambler 26_11 of the first interface circuit A is performed on the data that is the basis of the previous alignment error and other bits, which are different from the bits being the basis of the previous alignment error, forming the bit string stored in the LFSR. Accordingly, the N lane encoders 26_1 to 26_N may output data having a different data string from the encoded data that is the cause of the previous alignment error.

The data string of the data newly outputted in a consecutive normal state L0 may include logic values that transit enough to extract clock information. That is, if the newly outputted data string is transmitted to the second interface circuit B, the N CDR circuits 33_1 to 33_N of the second interface circuit B may correctly recover original data. Accordingly, an error occurring due to a generation of a data string that does not sufficiently transit may be recovered. The above procedure may be performed based on the third generation PCIe protocol.

However, in some cases, a bit string including a bit of a first bit position from among the bit string stored in the LFSR of the first interface circuit A may be the basis of an alignment error. In this case, if the first interface circuit A receives an 'EIEOS' order set after entering the recovery state RECOVERY, the bit string including the bit of the first bit position from among the bit string stored in the LFSR is used in the logical operation again. Thus, an error occurs again and the first interface circuit A enters the recovery state RECOVERY again. This procedure is repeated and the first and second interface circuits A and B are deadlocked by an error that may not be recovered. That is, an error that cannot be recovered by even the third generation PCIe protocol may occur.

According to exemplary embodiments, an error that cannot be recovered by even the third generation PCIe protocol may be prevented. In particular, transmission data that has a data string not including logic values that are successive for more than a reference succession number may be generated. Hereinafter, an interface circuit that operates according to exemplary embodiments and the PCIe protocol is mainly described. However, exemplary embodiments described below are examples for helping understanding the inventive concept, and one or more other exemplary embodiments are not limited thereto. For example, one or more other exemplary embodiments may be applied to an interface circuit that operates according to various communication protocols other than the PCIe protocol. Hereinafter, one or more exemplary embodiments will be described with reference to FIGS. 4 to 14.

Figure 4:
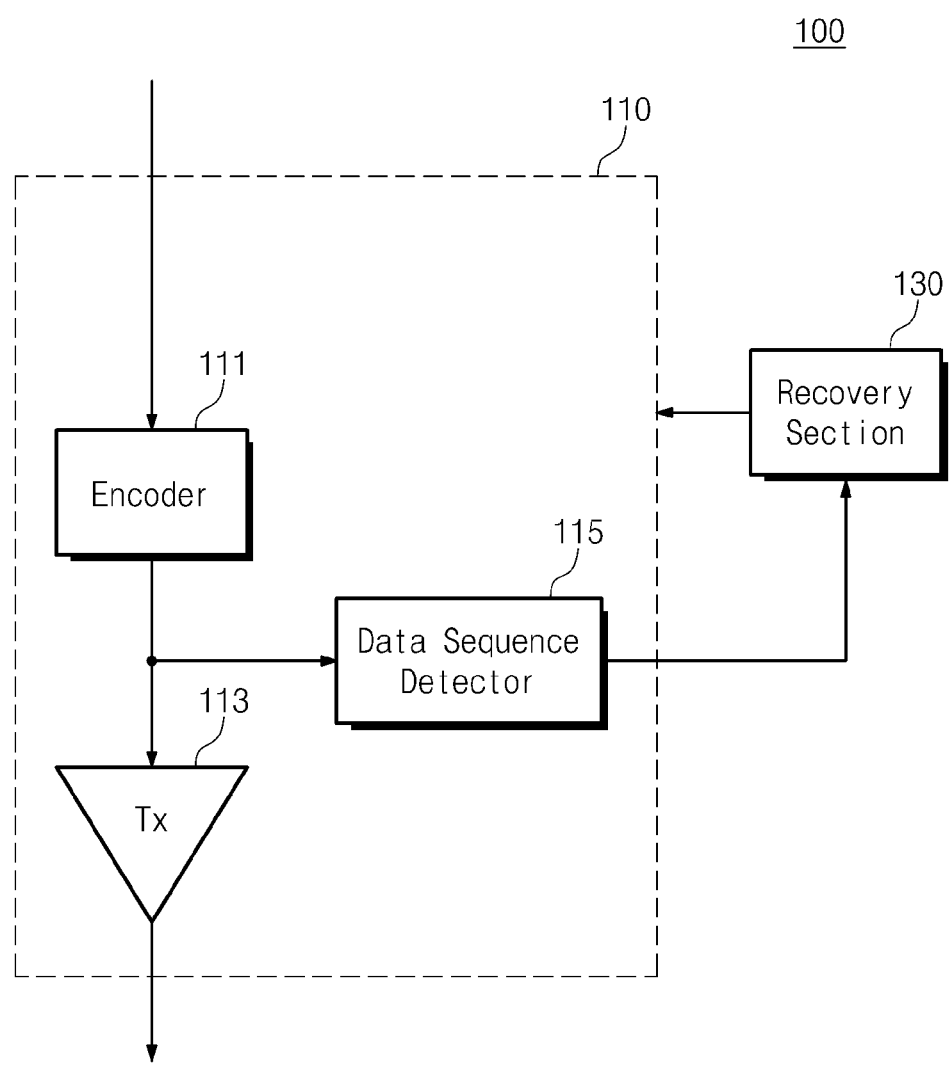
FIG. 4 is a block diagram illustrating a configuration of an interface circuit in accordance with an exemplary embodiment.

FIG. 4 is a block diagram illustrating a configuration of an interface circuit 100 in accordance with an exemplary embodiment. An interface circuit 100 may exchange data with another interface circuit according to a communication protocol. The interface circuit 100 may include an encoder 111 (e.g., encoding unit), a transmitter 113 (e.g., transmission unit), a data sequence detector 115 (e.g., data sequence detection unit), and a recovery section 130. The encoder 111, the transmitter 113, and the data sequence detector 115 may be included in a transmission section 110.

The transmission section 110 may receive input data. The input data may be provided to the encoder 111. The encoder 111 may encode the input data. The encoder 111 may generate transmission data as an encoding result. The transmission data is data to be transmitted to another interface circuit. According to an exemplary embodiment, when the interface circuit 100 operates according to the PCIe protocol, the encoder 111 may be or include lane encoders 26_1 to 26_N (refer to FIG. 1). In this exemplary embodiment, the encoder 111 may perform a logical operation on the input data and a bit string stored in advance. Further, the encoder 111 may add sync header data to a result of the logical operation to generate the transmission data. The transmission data generated by the encoder 111 may be provided to the transmitter 113. The transmitter 113 may output the transmission data to transmit the transmission data to another interface circuit.

The data sequence detector 115 may detect an error of the transmission data. In particular, the data sequence detector 115 may determine whether the number of successively same logic values in a data string of the transmission data is equal to or greater than a reference succession number. For instance, the data sequence detector 115 may determine whether the number of successive logic values of '0' or logic values of '1' in the data string of the transmission data is equal to or greater than the reference succession number, which may be pre-stored in a memory or storage unit.

In the case that the interface circuit 100 operates according to the PCIe protocol, the reference succession number, for instance, may be defined (e.g., predetermined) as a critical number that the number of successively same logic values must not exceed in order to make logic values of the data string of the transmission data transit sufficiently enough to extract clock information. That is, the data sequence detector 115 may detect whether the logic values of the data string of the transmission data sufficiently transit as needed to extract the clock information. If the number of successive logic values of '0' or logic values of '1' in the data string of the transmission data is equal to or greater than the reference succession number, it may be detected or determined that the logic values of the data string of the transmission data do not sufficiently transit as needed to extract the clock information. On the other hand, if the number of successive logic values of '0' and logic values of '1' in the data string of the transmission data is less than the reference succession number, it may be detected or determined that the logic values of the data string of the transmission data sufficiently transit as needed to extract the clock information.

According to an exemplary embodiment, the data sequence detector 115 may include a counter circuit. In this exemplary embodiment, the data sequence detector 115 may count the number of successively same logic values in the data string of the transmission data. According to an exemplary embodiment, the data sequence detector 115 may be connected to an output terminal of the encoder 111 to receive the transmission data. In the case that the interface circuit 100 operates according to the PCIe protocol, the transmission data may be provided to the data sequence detector 115 before the transmission data is serialized by serializers 28_1 to 28_N (refer to FIG. 1). However, the data sequence detector 115 may be configured to have a different connection relation. For instance, the data sequence detector 115 may receive the transmission data from the transmitter 113. It is understood that the exemplary embodiment illustrated in FIG. 4 is merely an example, and one or more other exemplary embodiments are not limited thereto.

The recovery section 130 may receive a detection result of the data sequence detector 115. The recovery section 130 may control a recovery operation of the interface circuit 100 based on the detection result of the data sequence detector 115. If the number of successive logic values of '0' or logic values of '1' in the data string of the transmission data is equal to or greater than the reference succession number (that is, if the logic values of the data string of the transmission data do not sufficiently transit as needed to extract the clock information), the recovery section 130 may control the interface circuit 100 such that the recovery operation is performed. In particular, the recovery section 130 may control the interface circuit 100 such that the recovery operation is performed in the transmission section 110. In the case that the interface circuit 100 operates according to the PCIe protocol, the recovery section 130 may be the LTSSM 40 (refer to FIG. 1).

If transmission data having a data string that does not sufficiently transit is generated in an interface circuit that operates according to the PCIe protocol, another interface circuit that receives the transmission data detects an error. Accordingly, the other interface circuit that receives the transmission data transmits an order set for entering the recovery state RECOVERY (refer to FIG. 3). The two interface circuits exchange transmission data with each other in the normal state L0 (refer to FIG. 3) again, after going through the recovery state. However, as described above, an error causing deadlock may occur.

On the other hand, according to an exemplary embodiment, if transmission data having a data string that does not sufficiently transit is generated, an interface circuit 100 that generates the transmission data may detect an error first. That is, an error may be detected in advance before the transmission data is transmitted to another interface circuit, and an error causing deadlock may be prevented by the recovery operation according to an exemplary embodiment. The recovery operation according to one or more exemplary embodiments will be described below with reference to FIGS. 6 to 10.

Figure 5:
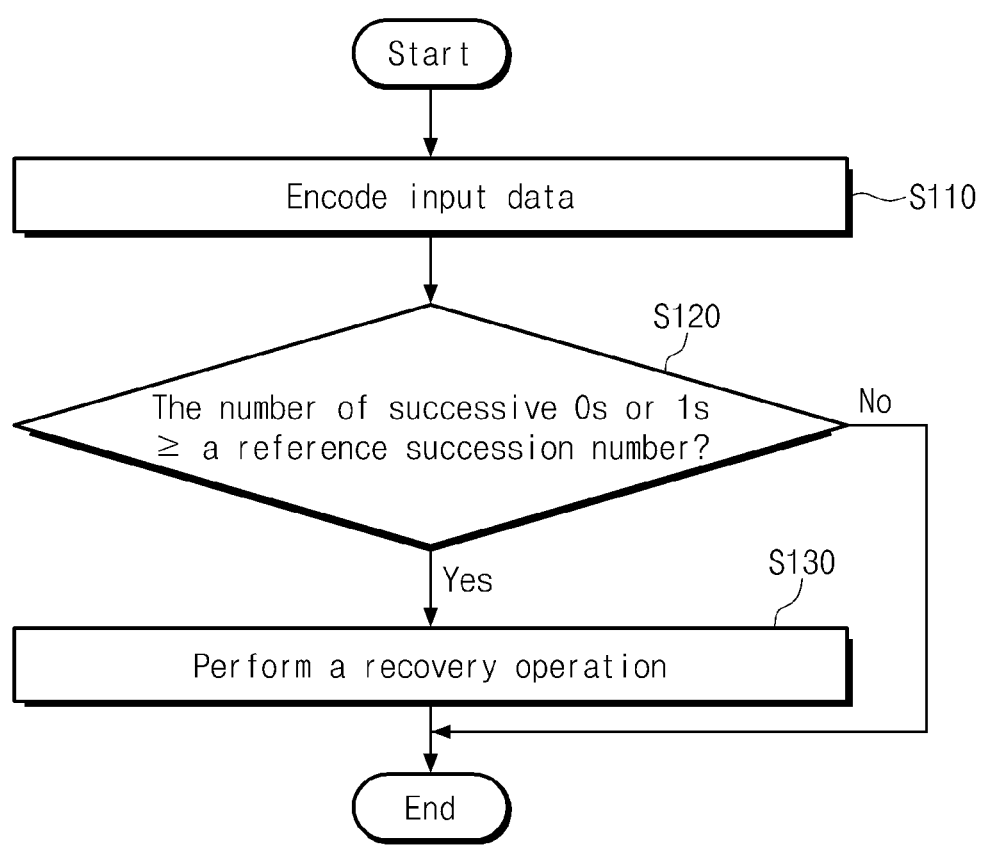
FIG. 5 is a flowchart illustrating an operation of an interface circuit in accordance with an exemplary embodiment.

FIG. 5 is a flowchart illustrating an operation of an interface circuit 100 in accordance with an exemplary embodiment.

In operation S110, input data may be encoded. As an encoding result, transmission data may be generated. According to an exemplary embodiment, in the case that an interface circuit 100 operates according to the PCIe protocol, a logical operation on the input data and a bit string stored in advance may be performed. Based on a result of the logical operation, the transmission data may be generated.

In operation S120, it may be determined whether the number of successively same logic values in a data string of the transmission data is equal to or greater than a reference succession number. That is, in operation S120, it may be determined whether the number of successive logic values of '0' or logic values of '1' in the data string of the transmission data is equal to or greater than the reference succession number. As described above, in the case that the interface circuit 100 operates according to the PCIe protocol, the reference succession number may be defined as a critical number that the number of successively same logic values must not exceed in order to make logic values of the data string of the transmission data transit sufficiently enough to extract clock information.

If the number of successive logic values of '0' or logic values of '1' in the data string of the transmission data is less than the reference succession number, it may be detected or determined that logic values of the data string of the transmission data sufficiently transit as needed to extract the clock information. In this case, a recovery operation may not be performed. On the other hand, if the number of successive logic values of '0' or logic values of '1' in the data string of the transmission data is equal to or greater than the reference succession number, it may be detected or determined that logic values of the data string of the transmission data do not sufficiently transit as needed to extract the clock information. In this case, the procedure continues to operation S130.

In operation S130, a recovery operation may be performed. If logic values of the data string of the transmission data do not sufficiently transit as needed to extract the clock information, an error may be recovered by a recovery operation. The recovery operation according to one or more exemplary embodiments will now be described with reference to FIGS. 6 to 10

Figure 6:
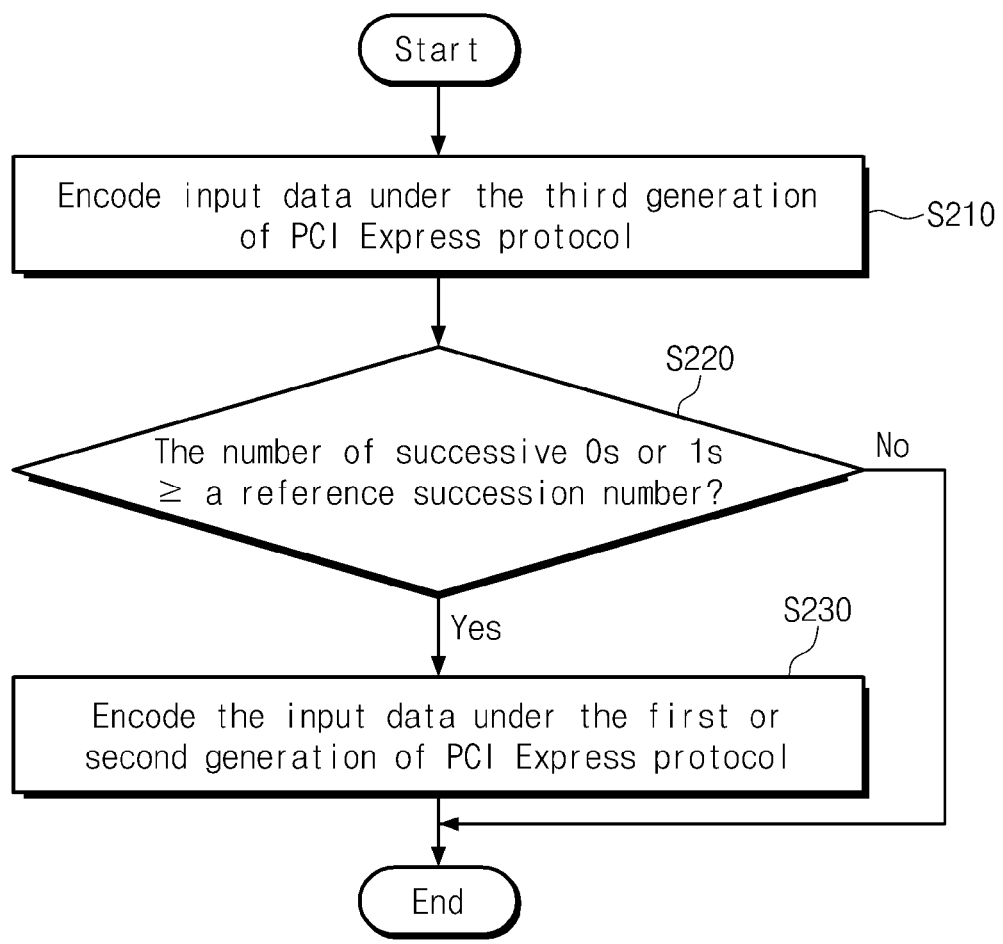
FIG. 6 is a flowchart illustrating, in further detail, an operation of an interface circuit in accordance with an exemplary embodiment.

FIG. 6 is a flowchart illustrating, in further detail, an operation of an interface circuit 100 in accordance with an exemplary embodiment.

In order to assist in understanding the present exemplary embodiment, reference will now be made to FIG. 4 together with FIG. 6. If the number of successive logic values of '0' or logic values of '1' in a data string of transmission data is equal to or greater than a reference succession number, a recovery operation may be performed. That is, if logic values of the data string of the transmission data do not sufficiently transit as needed to extract clock information, an interface circuit 100 may perform the recovery operation under a control of a recovery section 130.

According to an exemplary embodiment, according to the control of the recovery section 130, an encoder 111 may encode input data again with a different encoding method from an encoding method used when the transmission data having the data string that does not sufficiently transit is generated. In this case, the encoder 111 may generate changed transmission data having a different data string from the transmission data having the data string that does not sufficiently transit. If an encoding method is changed, the changed transmission data having a data string that sufficiently transits may be generated. A transmitter 113 may output the changed transmission data having the data string that sufficiently transits.

The flowchart of FIG. 6 represents a process performed in the case that the recovery operation is applied to an interface circuit 100 that operates according to the PCIe protocol. In operation S210, input data may be encoded. The input data may be encoded according to a 128b/130b encoding of the third generation PCIe protocol. As an encoding result, transmission data may be generated.

In operation S220, it may be determined whether the number of successively same logic values in a data string of the transmission data is equal to or greater than the reference succession number. That is, in operation S220, it may be determined whether the number of successive logic values of '0' or logic values of '1' in the data string of the transmission data is equal to or greater than the reference succession number. If the number of successive logic values of '0' or logic values of '1' in the data string of the transmission data is less than the reference succession number, it may be detected or determined that logic values of the data string of the transmission data sufficiently transit as needed to extract clock information. In this case, a recovery operation may not be performed. On the other hand, if the number of successive logic values of '0' or logic values of '1' in the data string of the transmission data is equal to or greater than the reference succession number, it may be detected or determined that logic values of the data string of the transmission data do not sufficiently transit as needed to extract the clock information. In this case, the procedure continues to operation S230.

In operation S230, the recovery operation may be performed. In operation S230, the input data may be encoded according to an 8b/10b encoding of the first generation PCIe protocol or the second generation PCIe protocol. That is, the encoding method used in operation S230 may be different from the encoding method used in operation S210. When the input data is encoded according to the 8b/10b encoding, changed transmission data having a data string that transits sufficiently enough to extract the clock information may be generated. The LTSSM 40 (refer to FIG. 1) may control the interface circuit 100 such that an operation mode is changed to perform the recovery operation. After the changed transmission data is outputted, the interface circuit 100 may operate according to the third generation PCIe protocol.

Figure 7:
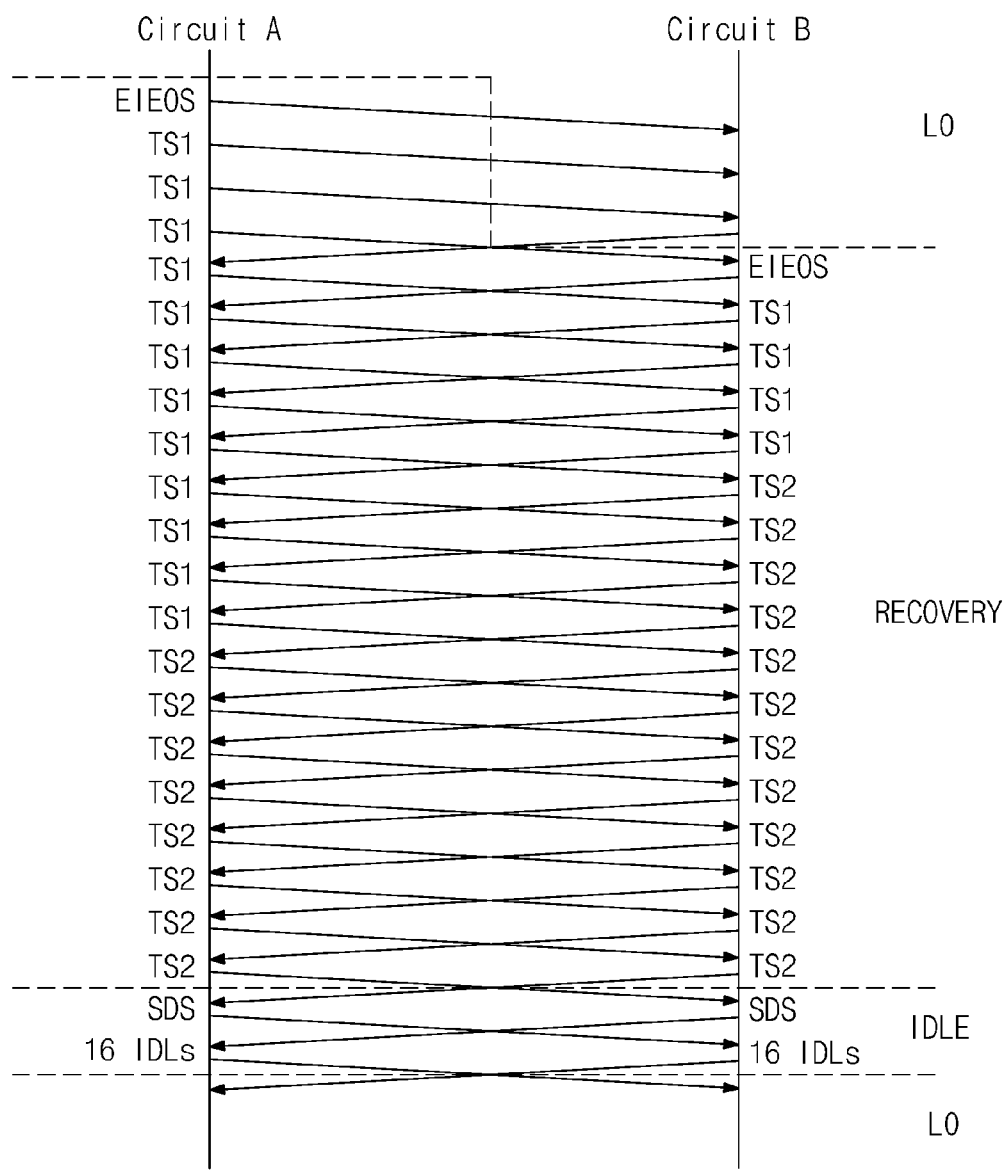
FIG. 7 is a schematic diagram illustrating an operation of an interface circuit in accordance with an exemplary embodiment.

FIG. 7 is a schematic diagram illustrating an operation of an interface circuit 100 in accordance with an exemplary embodiment.

In order to assist in understanding the present exemplary embodiment, reference will now be made to FIG. 4 together with FIG. 7. If the number of successive logic values of '0' or logic values of '1' in a data string of the transmission data is equal to or greater than a reference succession number, a recovery operation may be performed. That is, if logic values of the data string of the transmission data do not sufficiently transit as needed to extract clock information, an interface circuit 100 may perform the recovery operation under a control of a recovery section 130. The interface circuit 100 may enter the recovery state under the control of the recovery section 130.

The schematic diagram of FIG. 7 represents a process performed in the case that the recovery operation is applied to an interface circuit that operates according to the PCIe protocol. The first and second interface circuits A and B exchange data with each other in the normal state L0 according to the third generation PCIe protocol. If the number of successively same logic values in the data string of the transmission data generated in the first interface circuit A is equal to or greater than the reference succession number, the first interface circuit A may enter the recovery state under the control of the LTSSM 40 (refer to FIG. 1).

As described above with reference to FIG. 4, according to the PCIe protocol, the first interface circuit A and the second interface circuit B enter the recovery state RECOVERY after an 'EIEOS' order set is generated in the second interface circuit B. However, in the exemplary embodiment shown in FIG. 7, if the number of successively same logic values in the data string of the transmission data generated in the first interface circuit A is equal to or greater than the reference succession number, the first interface circuit A may immediately enter the recovery state RECOVERY. After that, the second interface circuit B may also enter the recovery state RECOVERY by the 'EIEOS' order set generated in the first interface circuit A.

According to the exemplary embodiment shown in FIG. 7, a pattern of order sets that the first and second interface circuits A and B exchange with each other may be different from that illustrated in FIG. 4. Thus, a bit string, from among a bit string stored in a LFSR of the first interface circuit A, used in a logical operation performed when the first and second interface circuits A and B exit the recovery state RECOVERY and then enter the normal state L0 again may be different from a bit string used in a logical operation performed when transmission data having a data string that does not sufficiently transit is generated. Accordingly, according to the exemplary embodiment illustrated in FIG. 7, changed transmission data having a data string that sufficiently transits may be generated.

Figure 8:
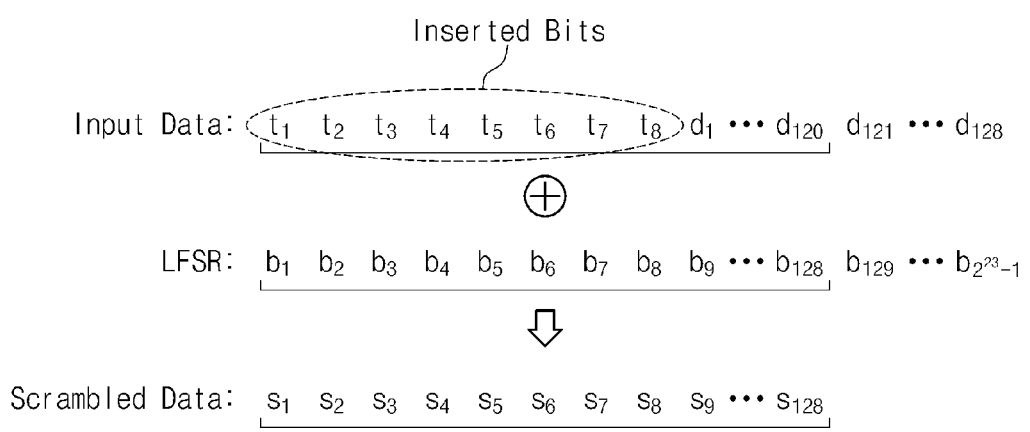
FIG. 8 is a schematic diagram illustrating an operation of an interface circuit in accordance with an exemplary embodiment.

FIG. 8 is a schematic diagram illustrating an operation of an interface circuit in accordance with an exemplary embodiment.

In order to assist in understanding the present exemplary embodiment, reference will now be made to FIG. 4 together with FIG. 8. If the number of successively same logic values in a data string of transmission data is equal to or greater than a reference succession number, a recovery operation may be performed. That is, if logic values of the data string of the transmission data do not sufficiently transit as needed to extract clock information, an interface circuit 100 may perform the recovery operation under a control of a recovery section 130.

According to an exemplary embodiment, under the control of the recovery section 130, one or more bits may be inserted into an arbitrary bit position in a data string of input data. Further, an encoder 111 may encode the input data together with one or more bits inserted into the input data. In this case, the encoder 111 may generate changed transmission data having a different data string from the transmission data having a data string that does not sufficiently transit. If the input data is changed, the changed transmission data having a data string that sufficiently transits may be generated. A transmitter 113 may output the changed transmission data having a data string that sufficiently transits.

The schematic diagram of FIG. 8 represents a process performed in the case that the recovery operation is applied to an interface circuit that operates according to the PCIe protocol. Under a control of a LTSSM 40 (refer to FIG. 1), one or more bits may be inserted into an arbitrary bit position in a data string of input data. In FIG. 8, it is shown that a bit string having a length of eight bits is inserted into a bit position in front of a first bit of a data string of input data. According to the exemplary embodiment illustrated in FIG. 8, the input data used in a logical operation together with the bit string stored in the LFSR may be changed. Thus, the changed transmission data having a different data string from the transmission data having a data string that does not sufficiently transit may be generated. Thus, according to the exemplary embodiment illustrated in FIG. 8, the changed transmission data having a data string that sufficiently transits may be generated.

According to an exemplary embodiment, in an interface circuit that operates according to the PCIe protocol, the one or more bits inserted into the input data may be a bit string corresponding to an idle (IDL) symbol. According to another exemplary embodiment, the one or more bits inserted into the input data may be a bit string corresponding to a data link layer packet (DLLP). Further, the one or more bits may be inserted into a bit position in front of a first bit of a data string of the input data. However, it is understood that one or more other exemplary embodiments are not limited to the above-described exemplary embodiments. For example, according to one or more other exemplary embodiments, the number of bits, a bit string pattern, and an insertion bit position of bits being inserted into the input data may vary. Another interface circuit receiving encoded data is configured to distinguish between the inserted one or more bits and the original input data.

Figure 9:
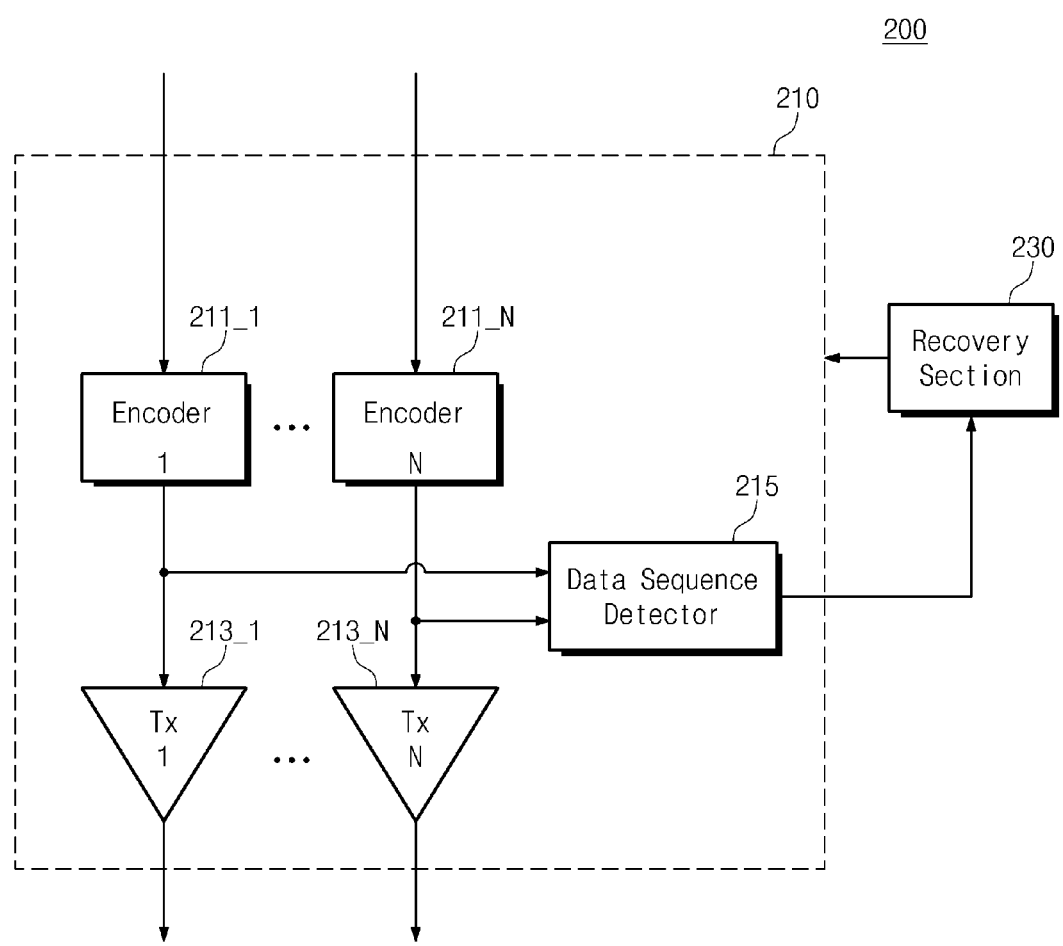
FIG. 9 is a block diagram illustrating a configuration of an interface circuit in accordance with an exemplary embodiment.

FIG. 9 is a block diagram illustrating a configuration of an interface circuit 200 in accordance with an exemplary embodiment. An interface circuit 200 may include N encoders 211_1 to 211_N, N transmitters 213_1 to 213_N, a data sequence detector 215, and a recovery section 230. The N encoders 211_1 to 211_N, the N transmitters 213_1 to 213_N, and the data sequence detector 215 may be included in a transmission section 210. Configurations and operations of each of the N encoders 211_1 to 211_N, each of the N transmitters 213_1 to 213_N, the data sequence detector 215, and the recovery section 230 may include same or similar configurations and operations of an encoder 111, a transmitter 113, a data sequence detector 115, and a recovery section 130 of FIG. 4, respectively. In relation to FIG. 4, redundant descriptions of the N encoders 211_1 to 211_N, the N transmitters 213_1 to 213_N, the data sequence detector 215, and the recovery section 230 are omitted below.

According to an exemplary embodiment, the transmission section 210 may include the plurality of encoders 211_1 to 211_N. The transmission section 210 may also include the plurality of transmitters 213_1 to 213_N. In the present exemplary embodiment, each of the N encoders 211_1 to 211_N is connected with each of the N transmitters 213_1 to 213_N in a one-to-one relationship. When the interface circuit 200 includes the N encoders 211_1 to 211_N and the N transmitters 213_1 to 213_N, a bandwidth increases.

The data sequence detector 215 may receive transmission data generated by each of the N encoders 211_1 to 211_N. The data sequence detector 215 may detect whether the number of successively same logic values in a data string of the received transmission data is equal to or greater than a reference succession number.

A first encoder included in the N encoders 211_1 to 211_N may encode received input data. The first encoder may generate first transmission data as an encoding result. The data sequence detector 215 may receive the first transmission data. The data sequence detector 215 may detect whether the number of successively same logic values in a data string of the first transmission data is equal to or greater than the reference succession number.

If the number of successively same logic values in the data string of the first transmission data is equal to or greater than the reference succession number, the recovery section 230 may control the interface circuit 200 such that a recovery operation is performed. In particular, the recovery section 230 may control the transmission section 210 such that the recovery operation is performed. Under a control of the recovery section 230, a second encoder included in the N encoders 211_1 to 211_N may receive the input data provided to the first encoder. The second encoder may generate a second transmission data as an encoding result. The second transmission data may have a data string different from the first transmission data. One of the N transmitters 213_1 to 213_N connected to the second encoder may output the second transmission data.

Even if the same input data is provided to each of the first and second encoders, encoding results obtained by each of the first and second encoders may be different from each other. For instance, in the case that the interface circuit 200 operates according to the PCIe protocol, as described above, LFSRs included in the N encoders 211_1 to 211_N store different bit strings from one another. That is, since a bit string used in a logical operation for an encoding of input data is different, encoding results obtained by each of the first and second encoders may be different from each other. Even though transmission data having a data string that does not sufficiently transit is generated by any one encoder from among the N encoders 211_1 to 211_N, if the same input data is encoded by another encoder, transmission data having a data string that sufficiently transits may be generated.

According to an exemplary embodiment, in the case that the interface circuit 200 operates according to the PCIe protocol, the N encoders 211_1 to 211_N may be N lane encoders 26_1 to 26_N (refer to FIG. 1). If the number of successively same logic values in a data string of a first transmission data generated by a first lane encoder is equal to or greater than the reference succession number, the interface circuit 200 may perform a recovery operation under a control of a LTSSM 40 (refer to FIG. 1). The input data provided to the first lane encoder may be provided to a second lane encoder. A LFSR of the first lane encoder and a LFSR of the second lane encoder may store different bit strings from each other. Thus, if the input data is encoded by the second lane encoder, a second transmission data having a different data string from the first transmission data may be generated. The second transmission data may have a data string that sufficiently transits.

Figure 10:
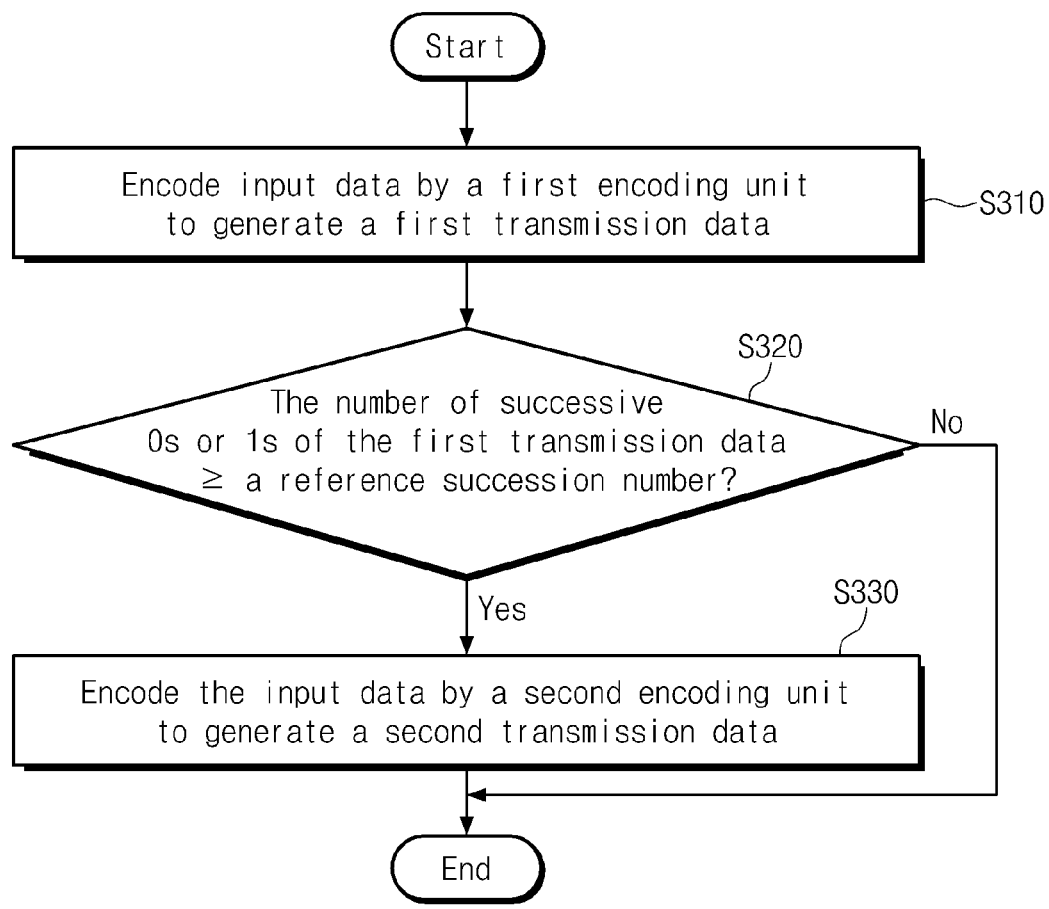
FIG. 10 is a flowchart illustrating an operation of an interface circuit in accordance with an exemplary embodiment.

FIG. 10 is a flowchart illustrating an operation of an interface circuit 200 in accordance with an exemplary embodiment.

In operation S310, input data may be encoded. In particular, in operation S310, input data may be encoded by a first encoder. As an encoding result, first transmission data may be generated.

In operation S320, it may be determined whether the number of successively same logic values in a data string of the first transmission data is equal to or greater than a reference succession number. That is, in operation S320, it may be determined whether the number of successive logic values of '0' or logic values of '1' in the data string of the first transmission data is equal to or greater than the reference succession number. If the number of successive logic values of '0' or logic values of '1' in the data string of the first transmission data is less than the reference succession number, it may be detected or determined that logic values of the data string of the first transmission data sufficiently transit as needed to extract clock information. In this case, a recovery operation may not be performed. On the other hand, if the number of successive logic values of '0' or logic values of '1' in the data string of the first transmission data is equal to or greater than the reference succession number, it may be detected or determined that logic values of the data string of the first transmission data do not sufficiently transit as needed to extract the clock information. In this case, operation S330 may be performed.

In operation S330, the recovery operation may be performed. In operation S330, the input data may be encoded again. In particular, in operation S330, the input data may be encoded by a second encoder. As an encoding result, second transmission data may be generated. Even though the same input data is encoded in operations S310 and S330, the first and second transmission data may have different data strings from each other. Even though the first transmission data generated by the first encoder has a data string that does not sufficiently transit, if the same input data is encoded by the second encoder, the second transmission data having a data string that sufficiently transits may be generated.

Figure 11:
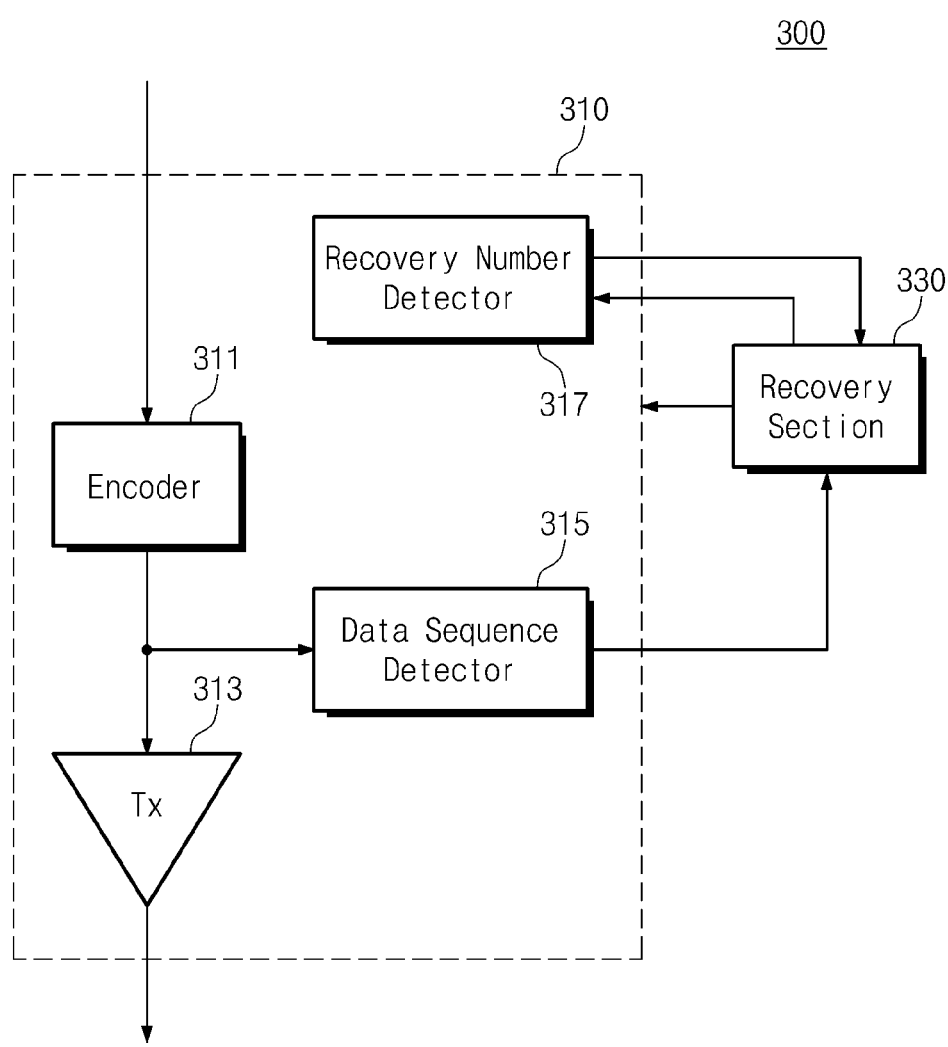
FIG. 11 is a block diagram illustrating a configuration of an interface circuit in accordance with an exemplary embodiment.

FIG. 11 is a block diagram illustrating a configuration of an interface circuit 300 in accordance with an exemplary embodiment. An interface circuit 300 may include an encoder 311, a transmitter 313, a data sequence detection circuit 315, a recovery number detector 317, and a recovery section 330. The encoder 311, the transmitter 313, the data sequence detection circuit 315, and the recovery number detector 317 may be included in a transmission section 310. Configurations and operations of the encoder 311, the transmitter 313, the data sequence detection circuit 315, and the recovery section 330 may include same or similar configurations and operations of the encoder 111, the transmitter 113, the data sequence detector 115, and the recovery section 130 of FIG. 4, respectively. In relation to FIG. 4, redundant descriptions of the encoder 311, the transmitter 313, the data sequence detector 315, and the recovery section 330 are omitted below.

The encoder 311 may encode input data to generate transmission data. The data sequence detector 315 may detect whether the number of successively same logic values in a data string of the transmission data is equal to or greater than a reference succession number. The recovery section 330 may control a recovery operation of the interface circuit 300 based on a detection result of the data sequence detector 315. That is, if the number of successively same logic values in the data string of the transmission data is equal to or greater than the reference succession number, the recovery operation may be performed under a control of the recovery section 330.

The recovery number detector 317 may count the number of times that the recovery operation is performed. According to an exemplary embodiment, the recovery number detector 317 may include a counter circuit. Further, the recovery number detector 317 may detect whether the number of times that the recovery operation is performed is equal to or greater than a reference recovery number. The reference recovery number may be determined to have a proper value as necessary, and may be pre-stored in a memory or storage unit.

The recovery section 330 may control the recovery operation of the interface circuit 300 based on a detection result of the recovery number detector 317 as well as a detection result of the data sequence detector 315. That is, if the number of times that the recovery operation is performed is equal to or greater than the reference recovery number, the recovery operation may be performed under the control of the recovery section 330. According to an exemplary embodiment, in the case that the interface circuit 300 operates according to the PCIe protocol, the recovery operation may be performed according to a control of a LTSSM 40 (refer to FIG. 1). The recovery operation performed based on the detection result of the recovery number detector 317 is described in detail below with reference to FIG. 12.

Figure 12:
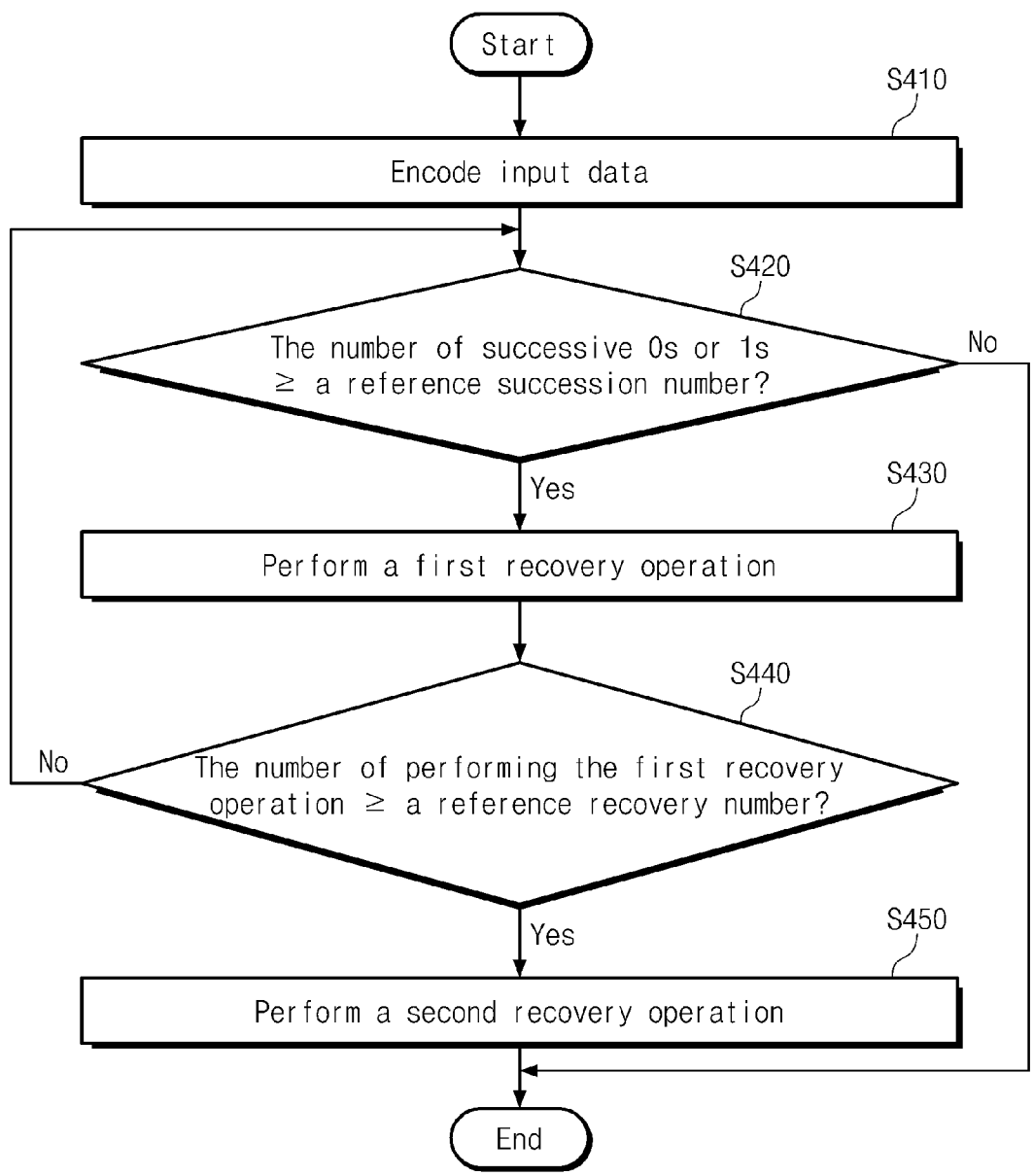
FIG. 12 is a flowchart illustrating an operation of an interface circuit in accordance with an exemplary embodiment.

FIG. 12 is a flowchart illustrating an operation of an interface circuit 300 in accordance with an exemplary embodiment.

In operation S410, input data may be encoded. As an encoding result, transmission data may be generated. According to an exemplary embodiment, in the case that the interface circuit 300 operates according to the PCIe protocol, a logical operation on the input data and a bit string stored in advance may be performed. Transmission data may be generated based on a result of the logical operation.

In operation S420, it may be determined whether the number of successively same logic values in a data string of the transmission data is equal to or greater than a reference succession number. That is, in operation S420, it may be determined whether the number of successive logic values of '0' or logic values of '1' in the data string of the transmission data is equal to or greater than the reference succession number. If the number of successive logic values of '0' or logic values of '1' in the data string of the transmission data is less than the reference succession number, it may be detected or determined that logic values of the data string of the transmission data sufficiently transit as needed to extract clock information. In this case, a recovery operation may not be performed. If the number of successive logic values of '0' or logic values of '1' in the data string of the transmission data is equal to or greater than the reference succession number, it may be detected or determined that logic values of the data string of the transmission data do not sufficiently transit as needed to extract the clock information. In this case, operation S430 may be performed.

In operation S430, a first recovery operation may be performed. That is, if logic values of the data string of the transmission data do not sufficiently transit as needed to extract the clock information, a recovery of an error may be attempted by the first recovery operation. The transmission data may be newly generated by the first recovery operation. For instance, the first recovery operation may be a recovery operation in accordance with the third generation PCIe protocol described above with reference to FIG. 3. As described above, even if the first operation is performed, an error may repeatedly occur.

In operation S440, it may be determined whether the number of times that the first recovery operation is performed is equal to or greater than a reference recovery number. For example, if the reference recovery number is three, it may be determined whether the first recovery operation is performed more than three times. If the number of times that the first recovery operation is performed is less than the reference recovery number, it may be determined whether the number of successively same logic values in a data string of the newly generated transmission data is equal to or greater than the reference succession number. If the number of successively same logic values in the data string of the newly generated transmission data is equal to or greater than the reference succession number, the first recovery operation may be performed again. That is, if logic values of the data string of the transmission data do not sufficiently transit as needed to extract the clock information, the first recovery operation may be repeatedly performed. If the number of times that the first recovery operation is performed is equal to or greater than the reference recovery number, operation S450 may be performed.

In operation S450, a second recovery operation is performed. Even though the first recovery operation is repeatedly performed, if logic values of the data string of the transmission data do not sufficiently transit as needed to extract the clock information, the second recovery operation, which is different from the first recovery operation performed in operation S430, may be performed. For instance, the second recovery operation may be at least one of the recovery operations described above with reference to FIGS. 6 to 10.

Figure 13:
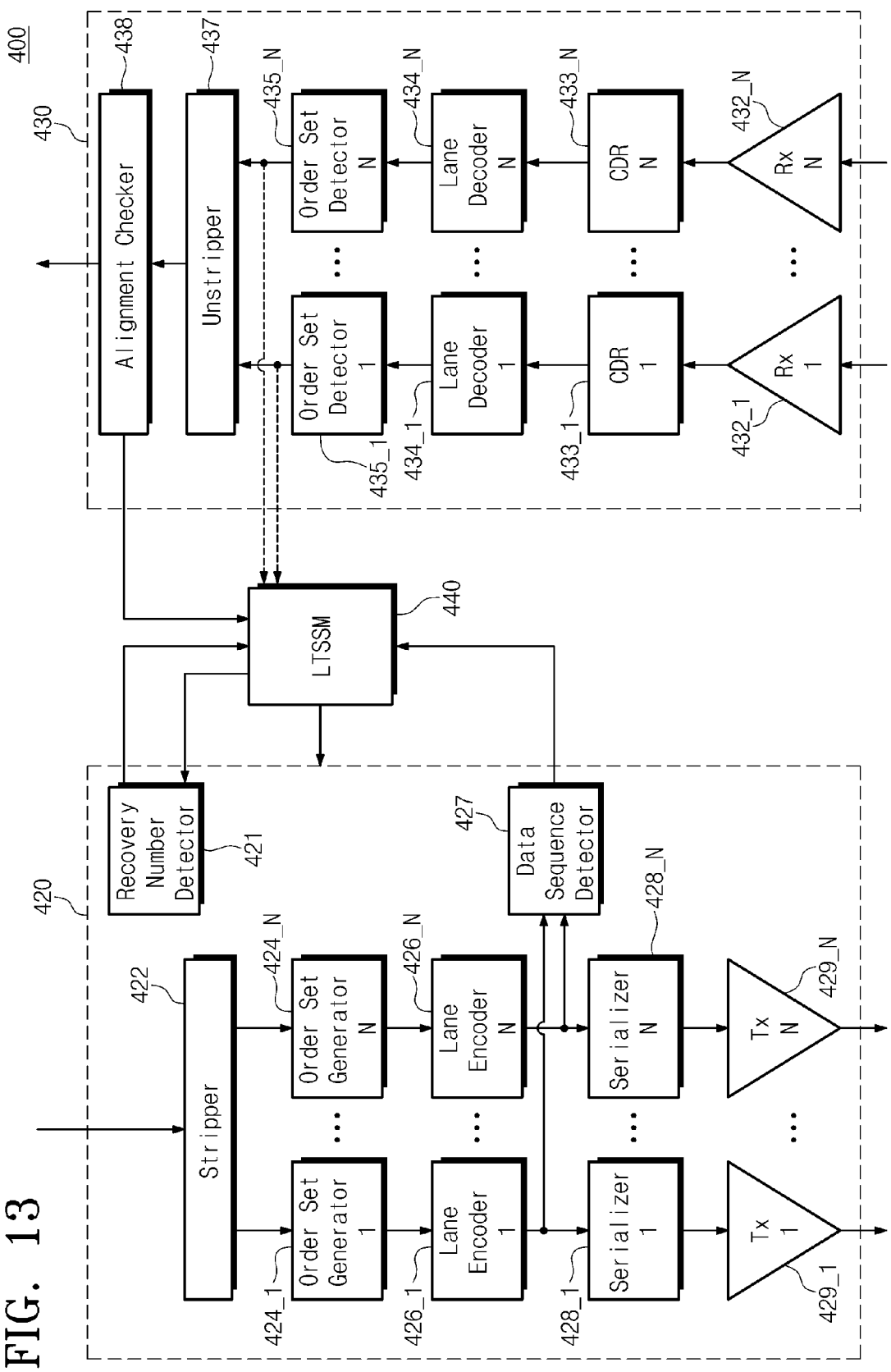
FIG. 13 is a block diagram illustrating an operation of an interface circuit to which an exemplary embodiment is applied.

FIG. 13 is a block diagram illustrating an operation of an interface circuit 400 to which an exemplary embodiment is applied. An interface circuit 400 of FIG. 13 operates according to the PCIe protocol. The interface circuit 400 may include a recovery number detector 421 and a data sequence detector 427 to implement an exemplary embodiment with an interface circuit 10 of FIG. 1.

Configurations and operations of a stripper 422, N order set generators 424_1 to 424_N, N lane encoders 426_1 to 426_N, N serializers 428_1 to 428_N, and N transmitters 429 _ 1 to 429_N included in a transmission section 420, N receiving units 432_1 to 432_N, N CDR circuits 433_1 to 433_N, N lane decoders 434_1 to 434_N, N order set detectors 435_1 to 435_N, an unstripper 437, and an alignment checker 438 included in a receiving section 430, and a LTSSM 440 may include configurations and operations of the stripper 22, the N order set generators 24_1 to 24_N, the N lane encoders 26_1 to 26_N, the N serializers 28_1 to 28_N, and the N transmitters 29_1 to 29_N included in the transmission section 20, the N receiving units 32_1 to 32_N, the N CDR circuits 33_1 to 33_N, the N lane decoders 34_1 to 34_N, the N order set detectors 35_1 to 35_N, the unstripper 37, and the alignment checker 38 included in the receiving section 30, and the LTSSM 40 of FIG. 1, respectively. In relation to FIG. 1, redundant descriptions of the stripper 422, the N order set generators 424_1 to 424_N, the N lane encoders 426_1 to 426_N, the N serializers 428_1 to 428_N, and the N transmitters 429_1 to 429_N included in the transmission section 420, the N receiving units 432_1 to 432_N, the N CDR circuits 433_1 to 433_N, the N lane decoders 434_1 to 434_N, the N order set detectors 435_1 to 435_N, the unstripper 437, and the alignment checker 438 included in the receiving section 430, and the LTSSM 440 are omitted below.

The data sequence detector 427 may perform same or similar operations of a data sequence detector 215 described above with reference to FIG. 9. That is, the data sequence detector 427 may detect errors of transmission data generated through the N lane encoders 426_1 to 426_N. The data sequence detector 427 may detect whether the number of successively same logic values in a data string of the transmission data is equal to or greater than a reference succession number.

The recovery number detector 421 may perform same or similar operations of a recovery number detector 317 described above with reference to FIG. 11. That is, the recovery number detector 421 may count the number of times that a recovery operation is performed. Further, the recovery number detector 421 may detect whether the number of times that the recovery operation is performed is equal to or greater than a reference recovery number.

The LTSSM 440 may control the recovery operation of the interface circuit 400 based on a detection result of the data sequence detector 427. Alternatively, the LTSSM 440 may control the recovery operation of the interface circuit 400 based on detection results of the data sequence detector 427 and the recovery number detector 421. The interface circuit 400 may perform the recovery operation according to one or more exemplary embodiments described above with reference to FIGS. 6 to 12.

Figure 14:
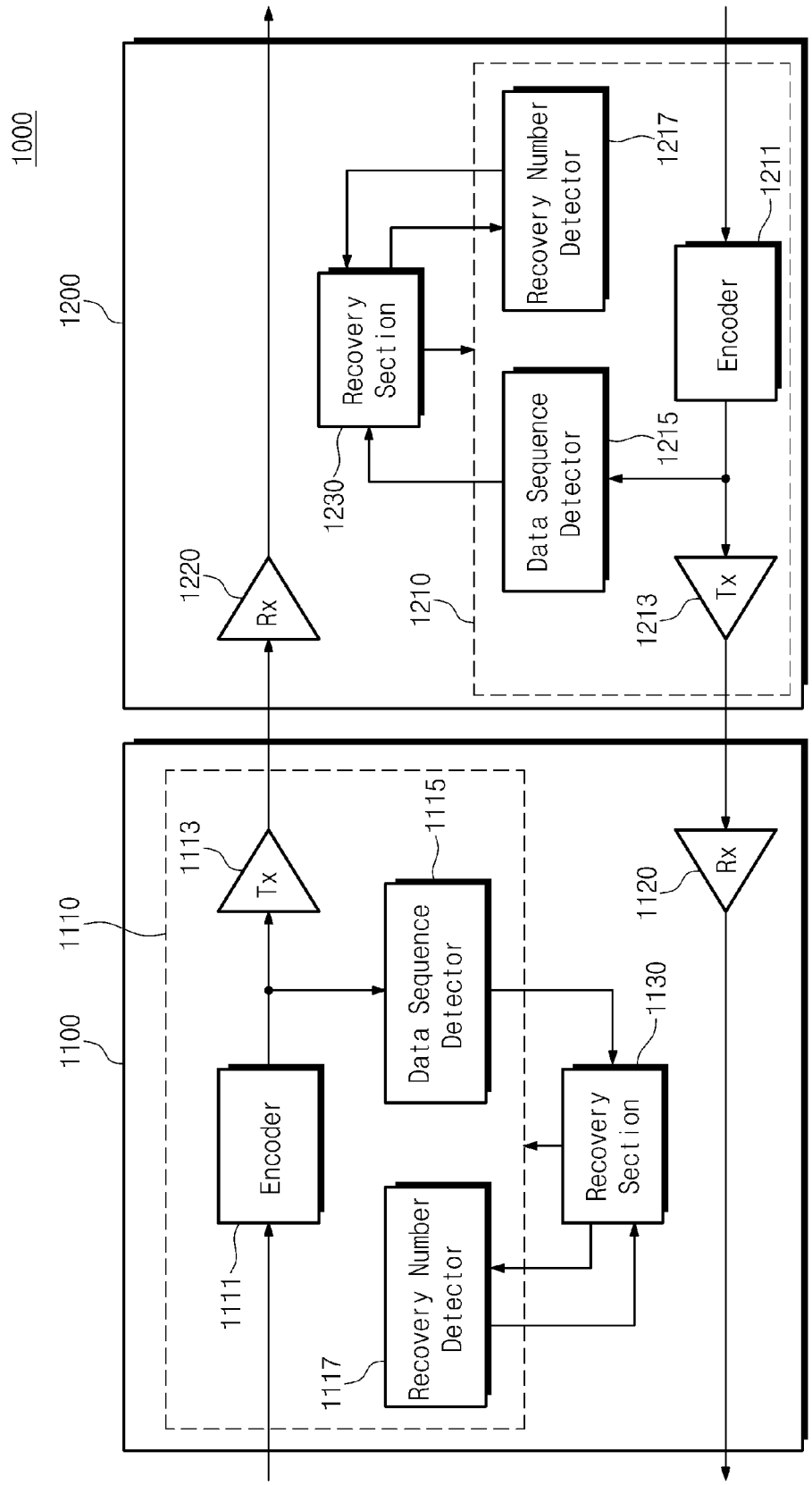
FIG. 14 is a block diagram illustrating a process in which two interface circuits exchange data with each other, in accordance with an exemplary embodiment.

FIG. 14 is a block diagram illustrating a process in which two interface circuits 1100 and 1200 exchange data with each other, according to an exemplary embodiment. An interface system 1000 may include a first interface circuit 1100 and a second interface circuit 1200. The first and second interface circuits 1100 and 1200 may include encoders 1111 and 1211, transmitters 1113 and 1213, data sequence detectors 1115 and 1215, recovery number detectors 1117 and 1217, receiving units 1120 and 1220, and recovery sections 1130 and 1230, respectively. The encoder 1111, the transmitter 1113, the data sequence detector 1115, and the recovery number detector 1117 may be included in a transmission section 1110. The encoder 1211, the transmitter 1213, the data sequence detector 1215, and the recovery number detector 1217 may be included in a transmission section 1210.

The data sequence detectors 1115 and 1215 may perform same or similar operations of a data sequence detector 115 described above with reference to FIG. 4. That is, the data sequence detectors 1115 may detect an error of transmission data generated through the encoder 1111. The data sequence detectors 1215 may detect an error of transmission data generated through the encoder 1211. The data sequence detectors 1115 and 1215 may detect whether the number of successively same logic values in the data string of the transmission data is equal to or greater than the reference succession number.

The recovery number detectors 1117 and 1217 may perform same or similar operations of a recovery number detector 317 described above with reference to FIG. 11. That is, the recovery number detector 1117 may count the number of times that a recovery operation is performed in the first interface circuit 1100. The recovery number detector 1217 may count the number of times that a recovery operation is performed in the second interface circuit 1200. Further, the recovery number detectors 1117 and 1217 may detect whether the number of times that the recovery operation is performed is equal to or greater than a reference recovery number.

The recovery section 1130 may control the recovery operation of the first interface circuit 1100 based on a detection result of the data sequence detector 1115. Alternatively, the recovery section 1130 may control the recovery operation of the first interface circuit 1100 based on detection results of the data sequence detector 1115 and the recovery number detector 1117. The recovery section 1230 may control the recovery operation of the second interface circuit 1200 based on a detection result of the data sequence detector 1215. Alternatively, the recovery section 1230 may control the recovery operation of the second interface circuit 1200 based on detection results of the data sequence detector 1215 and the recovery number detector 1217. The first and second interface circuits 1100 and 1200 may perform the recovery operation according to one or more exemplary embodiments described above with reference to FIGS. 6 to 12.

Although not illustrated in FIGS. 4, 9, and 11, the interface circuit 100, 200, and 300 may include a receiving section. The first and second interface circuits 1100 and 1200 may include receivers 1120 and 1220 (e.g., receiving units) included in receiving sections, respectively. The receiver 1120 may receive data transmitted from the transmitter 1213. The receiver 1220 may receive data transmitted from the transmitter 1113.

According to one or more exemplary embodiments, if the number of successively same logic values in the data string of the transmission data is equal to or greater than the reference succession number, the interface circuit may perform the recovery operation. Thus, the transmission data that has a data string not including logic values that are successive for more than the reference succession number may be generated. In particular, an error that cannot be recovered by the third generation PCIe protocol may be prevented. An error that occurs in the case that the number of successively same logic values in the data string of the transmission data is equal to or greater than the reference succession number may be prevented.

According to one or more exemplary embodiments, data loss may be prevented, and data reliability may be guaranteed. Thus, an exemplary embodiment may be utilized in an environment that requires high data reliability, such as a nuclear weapon control system. Furthermore, an error being intentionally generated by a malicious attacker may be prevented. The above-described exemplary embodiments are mainly illustrated with respect to a limitation of the third generation PCIe protocol, though it is understood that one or more other exemplary embodiments may be applied to any other interface circuits that operate according to other communication protocols.

Figure 15:
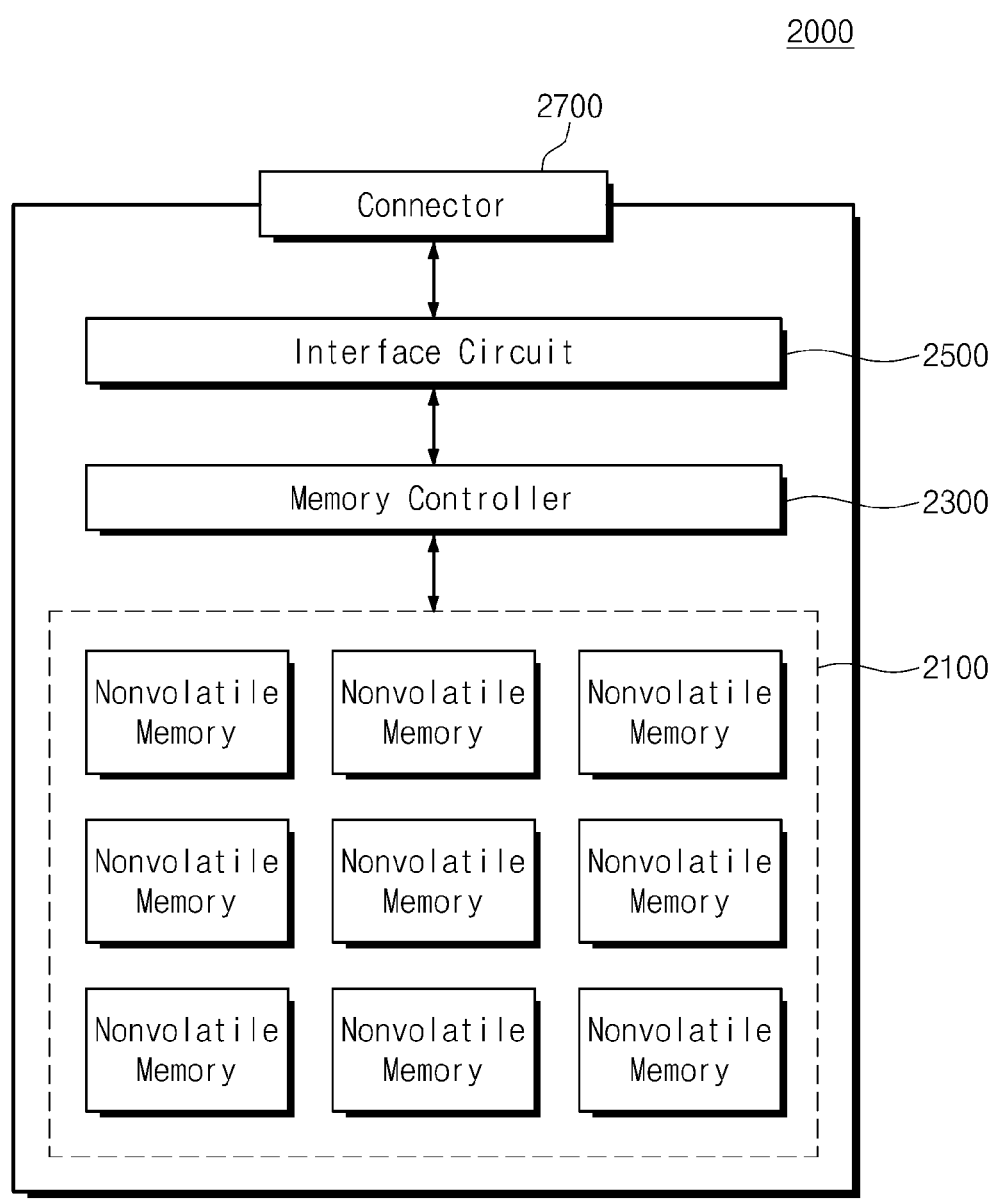
FIG. 15 is a block diagram illustrating a configuration of a storage including an interface circuit in accordance with an exemplary embodiment.

FIG. 15 is a block diagram illustrating a configuration of a storage 2000 including an interface circuit in accordance with an exemplary embodiment. A storage 2000 may include a plurality of nonvolatile memories 2100, a memory controller 2300, an interface circuit 2500, and a connector 2700.

Each of the nonvolatile memories 2100 may store data. According to an exemplary embodiment, each of the nonvolatile memories 2100 may be a flash memory. In this exemplary embodiment, the storage 2000 may be a solid state drive. However, one or more other exemplary embodiments are not limited thereto. For example, according to another exemplary embodiment, each of the nonvolatile memories 2100 may include at least one of a phase-change RAM (PRAM), a ferroelectric RAM (FRAM), a resistive RAM (RRAM), and a magnetic RAM (MRAM). An operation of the plurality of nonvolatile memories 2100 may be controlled by the memory controller 2300.

The interface circuit 2500 may interface a transmission/reception of data between a host and the storage 2000. The interface circuit 2500 may be configured to perform a recovery operation according to an exemplary embodiment. That is, if the number of successively same logic values in the data string of the transmission data is equal to or greater than the reference succession number, the interface circuit 2500 may perform at least one of the recovery operations described above with reference to FIGS. 6 to 12. The connector 2700 is configured to connect the storage 2000 to the host. According to an exemplary embodiment, the interface circuit 2500 may operate according to the PCIe protocol. In the present exemplary embodiment, the connector 2700 may be configured to enable a communication according to the PCIe protocol.

In FIG. 15, the storage 2000 is illustrated as a device including the interface circuit 2500 to which an exemplary embodiment is applied. However, the interface circuit 2500 may be included in different kinds of electronic devices. For example, the interface circuit 2500 according to other exemplary embodiments may be included in various types of electronic devices such as a main board, a printer, a scanner, a modem, etc. Further, in the case that the interface circuit 2500 operates according to the PCIe protocol, the interface circuit 2500 according to an exemplary embodiment may be included in an electronic device such as a graphic card or a sound card. However, it is understood that one or more other exemplary embodiments are not limited thereto.

Figure 16:
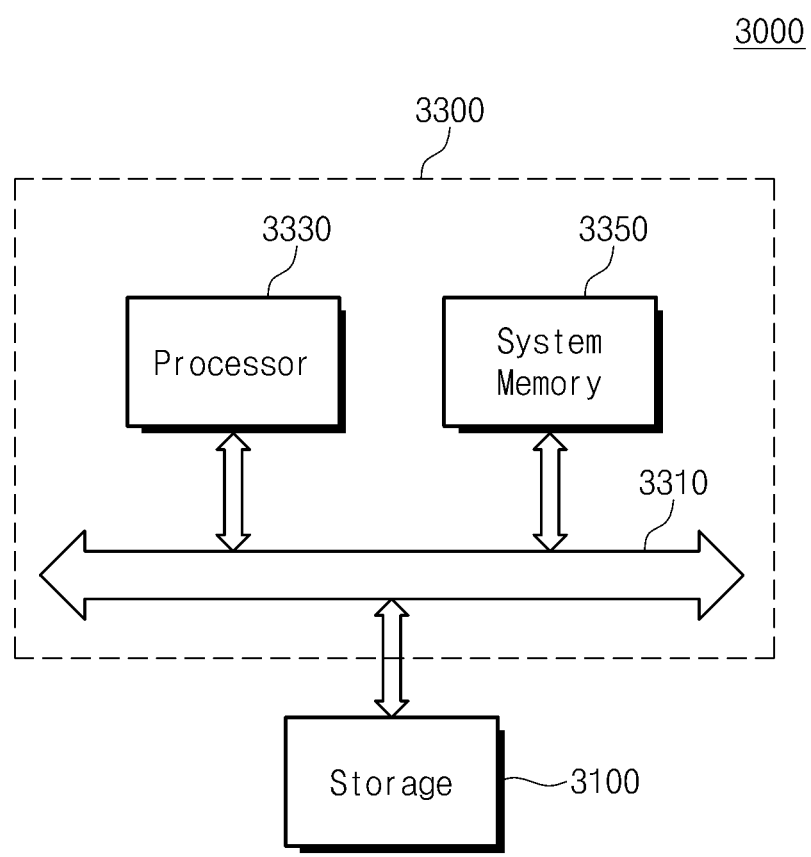
FIG. 16 is a block diagram illustrating a configuration of a computing system including a storage to which an exemplary embodiment is applied.

FIG. 16 is a block diagram illustrating a configuration of a computing system 3000 including a storage 3100 to which an exemplary embodiment is applied. A computing system 3000 may include storage 3100 and a host 3300. The host 3300 may include a bus 3310, a processor 3330, and a system memory 3350. The storage 3100 may have the same or similar configurations as the storage 2000 illustrated in FIG. 15. In relation to FIG. 15, redundant descriptions of the storage 3100 are omitted below.

The bus 3310 may provide a channel for communication between components of the computing system 3000. For instance, the bus 3310 may provide the channel for communication between the storage 3100, the processor 3330, and the system memory 3350. Further, the bus 3310 may provide the channel for communication between other components not illustrated in FIG. 16. The bus 3310 may operate according to a standard interface protocol of the computing system 3000. According to an exemplary embodiment, the bus 3310 may operate according to the PCIe protocol. However, this is only an example, and the bus 3310 may operate according to various communication protocols in one or more other exemplary embodiments.

The processor 3330 may control operations of the components of the computing system 3000 through the bus 3310. For instance, the processor 3330 may control the system memory 3350 and the storage 3100 through the bus 3310. According to an exemplary embodiment, the processor 3330 may control operations of the components of the computing system 3000 according to the PCIe protocol. According to an exemplary embodiment, the processor 3330 may be a general-purposed central processing unit (CPU) or an application processor (AP).

The system memory 3350 may communicate with the processor 3330 and the storage 3100 through the bus 3310. The system memory 3350 may include a volatile memory such as a static RAM (SRAM), a dynamic RAM (DRAM), and a synchronous DRAM (SDRAM), and/or a nonvolatile memory such as a PRAM, a MRAM, a RRAM, and a FRAM.

The host 3300 may read out data stored in the storage 3100 or transmit data to storage 3100.

The storage 3100 may include the memory controller 2300 described above with reference to FIG. 15. The memory controller 2300 may have device information identified by the bus 3310 or the processor 3330. For instance, if the storage 3100 is connected to the bus 3310 by the connector 2700 described above with reference to FIG. 15, the memory controller 2300 may perform a predetermined communication with the bus 3310 or the processor 3330. By performing the predetermined communication, the storage 3100 may be identified as a specific device by the bus 3310 or the processor 3330.

The device configuration shown in each block diagram is provided to understand exemplary embodiments. Each block may include sub-blocks according to operations. Alternatively, a plurality of blocks may constitute a larger-unit of block. That is, an exemplary embodiment is not limited to the configuration shown in each block diagram.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more of the above-described elements can include circuitry, a processor, a microprocessor, etc., and may execute a computer program stored in a computer-readable medium.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings and advantages of the present inventive concept. Accordingly, all such modifications are intended to be included within the scope of the present inventive concept as defined in the claims. The present inventive concept is defined by the following claims, with equivalents of the claims to be included therein.

What is claimed is:

1. An interface circuit configured to transmit and receive data, the interface circuit comprising:
an encoder configured to encode input data to generate transmission data;
a data sequence detector configured to count a number of successively same logic values in a data string of the transmission data to detect whether the number of the successively same logic values in the data string of the transmission data is equal to or greater than a reference succession number;
a recovery section configured to control, based on a detection result of the data sequence detector, a recovery operation with respect to the transmission data; and
a transmitter configured to output the transmission data.

2. The interface circuit of claim 1, wherein in response to the data sequence detector detecting that the number of the successively same logic values in the data string of the transmission data is equal to or greater than the reference succession number, according to a control of the recovery section, the encoder generates changed transmission data having a different data string from the transmission data by encoding the input data with a different encoding method from an encoding method used when the transmission data is generated, and the transmitter outputs the changed transmission data.

3. The interface circuit of claim 1, wherein in response to the data sequence detector detecting that the number of the successively same logic values in the data string of the transmission data is equal to or greater than the reference succession number, according to a control of the recovery section, the recovery section controls the recovery operation to be performed.

4. The interface circuit of claim 1, wherein in response to the data sequence detector detecting that the number of the successively same logic values in the data string of the transmission data is equal to or greater than the reference succession number, according to a control of the recovery section, one or more bits are inserted into a bit position in a data string of the input data, the encoder encodes the input data together with the inserted one or more bits to generate changed transmission data having a different data string from the transmission data, and the transmitter outputs the changed transmission data.

5. The interface circuit of claim 1, wherein:
the encoder comprises a plurality of encoders; and
the transmitter comprises a plurality of transmitters,
wherein the plurality of encoders is connected to the plurality of transmitters in a one-to-one relationship.

6. The interface circuit of claim 5, wherein:
a first encoder, among the plurality of encoders, encodes the input data to generate first transmission data; and
in response to the data sequence detector detecting that a number of successively same logic values in a data string of the first transmission data is equal to or greater than the reference succession number, according to a control of the recovery section, a second encoder included in the plurality of encoders encodes the input data to generate second transmission data having a different data string from the first transmission data, and one of the plurality of transmitters connected to the second encoder outputs the second transmission data.

7. The interface circuit of claim 1, further comprising:
a recovery number detector configured to detect whether a number of times that the recovery operation is performed is equal to or greater than a reference recovery number,
wherein the recovery section controls the recovery operation with respect to the transmission data, based on the detection result of the data sequence detector and a detection result of the recovery number detector.

8. The interface circuit of claim 1, wherein the data sequence detector comprises a counter circuit configured to count the number of the successively same logic values in the data string of the transmission data.

9. An interface circuit configured to transmit and receive data according to a peripheral component interconnect express (PCIe) protocol, the interface circuit comprising:
a lane encoder configured to encode input data with a first encoding method of the PCIe protocol to generate transmission data;
a data sequence detector configured to detect whether a number of successively same logic values in a data string of the transmission data is equal to or greater than a reference succession number;
a link training and status state machine (LTSSM) configured to control, based on a detection result of the data sequence detector, a recovery operation with respect to the transmission data; and
a transmitter configured to output the transmission data.

10. The interface circuit of claim 9, wherein in response to the data sequence detector detecting that the number of the successively same logic values in the data string of the transmission data is equal to or greater than the reference succession number, according to a control of the LTSSM, the lane encoder encodes the input data with a second encoding method of a first generation PCIe protocol or a second generation PCIe protocol, different from the first encoding method, to generate changed transmission data having a different data string from the transmission data, and the transmitter outputs the changed transmission data.

11. The interface circuit of claim 10, wherein after the changed transmission data is output, the lane encoder operates according to a third generation PCIe protocol.

12. The interface circuit of claim 9, wherein in response to the data sequence detector detecting that the number of the successively same logic values in the data string of the transmission data is equal to or greater than the reference succession number, according to a control of the LTSSM, the interface circuit enters a recovery state.

13. The interface circuit of claim 9, wherein in response to the data sequence detector detecting that the number of the successively same logic values in the data string of the transmission data is equal to or greater than the reference succession number, according to a control of the LTSSM, one or more bits are inserted into a bit position in a data string of the input data, the lane encoder encodes the input data together with the inserted one or more bits to generate changed transmission data having a different data string from the transmission data, and the transmitter outputs the changed transmission data.

14. The interface circuit of claim 13, wherein:
the one or more bits are a bit string corresponding to at least one of an idle (IDL) symbol and a data link layer packet (DLLP); and
the one or more bits are inserted into a bit position in front of a first bit of the data string of the input data.

15. The interface circuit of claim 9, wherein:
the lane encoder comprises a plurality of lane encoders;
the transmitter comprises a plurality of transmitters;
the plurality of lane encoders is connected to the plurality of transmitters in a one-to-one relationship;
a first lane encoder included in the plurality of lane encoders encodes the input data to generate first transmission data; and
if a number of successively same logic values in a data string of the first transmission data is equal to or greater than the reference succession number, according to a control of the LTSSM, a second lane encoder included in the plurality of lane encoders encodes the input data to generate second transmission data having a different data string from the first transmission data, and one of the plurality of transmitters connected to the second lane encoder outputs the second transmission data.

16. The interface circuit of claim 9, further comprising:
a recovery number detector configured to detect whether a number of times that the recovery operation is performed is equal to or greater than a reference recovery number,
wherein the LTSSM controls the recovery operation with respect to the transmission data, based on the detection result of the data sequence detector and a detection result of the recovery number detector.

17. A method of generating transmission data, the method comprising:
encoding, by a transmitting device, input data to generate transmission data;
detecting, by the transmitting device, whether a data string of the transmission data sufficiently transits to extract clock information based on whether a number of successively same logic values in the data string of the transmission data is equal to or greater than a reference succession number; and
determining, by the transmitting device, whether to perform a recovery operation with respect to the transmission data, based on a result of the detecting.

18. The method of claim 17, wherein the determining whether to perform the recovery operation comprises, in response to the result of the detecting determining that the data string of the transmission data does not sufficiently transit to extract the clock information, controlling the recovery operation to be performed.

19. The method of claim 18, wherein the controlling the recovery operation to be performed comprises:
encoding the input data with a different encoding method than that performed to generate the transmission data, to generate changed transmission data having a different data string from the transmission data; and
transmitting the changed transmission data.

20. The method of claim 18, wherein the controlling the recovery operation to be performed comprises:
inserting one or more bits into the input data;
encoding the input data including the inserted one or more bits, to generate changed transmission data having a different data string from the transmission data; and
transmitting the changed transmission data.

* * * * *